(12) United States Patent
Shokri Razaghi et al.

(10) Patent No.: US 12,165,283 B2
(45) Date of Patent: Dec. 10, 2024

(54) CONFIGURABLE IMAGE ENHANCEMENT

(71) Applicant: QUALCOMM Incorporated, San Diego, CA (US)

(72) Inventors: Hooshmand Shokri Razaghi, Toronto (CA); Alireza Shoa Hassani Lashdan, Burlington (CA); Darren Gnanapragasam, Aurora (CA); Stone Yun, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 547 days.

(21) Appl. No.: 17/382,675

(22) Filed: Jul. 22, 2021

(65) Prior Publication Data
US 2023/0028736 A1 Jan. 26, 2023

(51) Int. Cl.
*G06T 5/00* (2024.01)
*G06N 3/088* (2023.01)
(Continued)

(52) U.S. Cl.
CPC ............... *G06T 5/50* (2013.01); *G06N 3/088* (2013.01); *G06T 3/4046* (2013.01); *G06T 3/4053* (2013.01); *G06T 7/0002* (2013.01); *H04N 19/154* (2014.11); *H04N 19/86* (2014.11); *H04N 19/87* (2014.11);
(Continued)

(58) Field of Classification Search
CPC .... H04N 19/86; H04N 19/176; H04N 19/154; H04N 19/14; H04N 19/142; H04N 19/87; H04N 9/7908; H04N 9/646; H04N 5/208; G06T 2207/10016; G06T 3/4046; G06T 2207/20081; G06T 2207/20084; G06T 2207/20172; G06T 2207/30168
See application file for complete search history.

(56) References Cited

U.S. PATENT DOCUMENTS 7,031,388 B2  4/2006  Yang et al.
10,616,590 B1  4/2020  Wei et al.
(Continued)

FOREIGN PATENT DOCUMENTS

EP  2051524 A1  4/2009
WO  2006056940 A1  6/2006
(Continued)

OTHER PUBLICATIONS

Veerabadran, Vijay, et al. "Adversarial distortion for learned video compression." Proceedings of the IEEE/CVF Conference on Computer Vision and Pattern Recognition Workshops. 2020.*
(Continued)

*Primary Examiner* — Li Liu
(74) *Attorney, Agent, or Firm* — QUALCOMM Incorporated; Espartaco Diaz Hidalgo

(57) ABSTRACT

A device includes a memory and one or more processors. The memory is configured to store an image enhancement network of an image enhancer. The one or more processors are configured to predict an image compression quality of an image of a stream of images. The one or more processors are also configured to configure the image enhancer based on the image compression quality. The one or more processors are further configured to process, using the image enhancement network of the configured image enhancer, the image to generate an enhanced image.

29 Claims, 12 Drawing Sheets

(51) Int. Cl.

| | |
|---|---|
| *G06T 3/4046* | (2024.01) |
| *G06T 3/4053* | (2024.01) |
| *G06T 5/50* | (2006.01) |
| *G06T 7/00* | (2017.01) |
| *H04N 19/154* | (2014.01) |
| *H04N 19/86* | (2014.01) |
| *H04N 19/87* | (2014.01) |

(52) U.S. Cl.
CPC ............... *G06T 2207/10016* (2013.01); *G06T 2207/20081* (2013.01); *G06T 2207/20084* (2013.01); *G06T 2207/20224* (2013.01); *G06T 2207/30168* (2013.01)

(56) References Cited

U.S. PATENT DOCUMENTS

| | | | |
|---|---|---|---|
| 2003/0123747 A1 | 7/2003 | Yang et al. | |
| 2003/0206591 A1* | 11/2003 | Yang .................... | H04N 19/182 348/700 |
| 2010/0226438 A1* | 9/2010 | Saunders ............... | H04N 19/63 375/E7.243 |
| 2016/0360202 A1* | 12/2016 | Xu .......................... | G06N 3/084 |
| 2017/0150149 A1 | 5/2017 | Carmel et al. | |
| 2020/0186836 A1 | 6/2020 | Milanfar et al. | |
| 2020/0280730 A1 | 9/2020 | Wang et al. | |
| 2020/0334535 A1 | 10/2020 | Rippel et al. | |
| 2020/0349681 A1 | 11/2020 | Andrei et al. | |
| 2020/0394773 A1* | 12/2020 | Wilensky ............... | G06T 5/009 |

FOREIGN PATENT DOCUMENTS

| | | |
|---|---|---|
| WO | 2019111011 A1 | 6/2019 |
| WO | 2019161303 A1 | 8/2019 |

OTHER PUBLICATIONS

Ledig, Christian, et al. "Photo-realistic single image super-resolution using a generative adversarial network." Proceedings of the IEEE conference on computer vision and pattern recognition. 2017.*

Galteri, Leonardo, et al. "Deep generative adversarial compression artifact removal." Proceedings of the IEEE International Conference on Computer Vision. 2017.*

International Search Report and Written Opinion—PCT/US2022/073934—ISA/EPO—Jan. 5, 2023.

Kotra (Qualcomm) A.M., et al., "AHG11: Neural Network-based Super Resolution", 21. JVET Meeting, Jan. 6, 2021-Jan. 15, 2021, Teleconference, (The Joint Video Exploration Team of ISO/IEC JTC1/SC29/WG11 and ITU-T SG.16), No. JVET-U0099, 6 Pages, Jan. 7, 2021, XP030293236, the whole document, abstract.

Ma D., et al., "CVEGAN: A Perceptually-Inspired GAN for Compressed Video Enhancement", arxiv.org, Cornell University Library, 201 Olin Library Cornell University Ithaca, NY 14853, Nov. 18, 2020, XP081817038, second paragraph of section I, section II.D, 10 Pages.

Partial International Search Report—PCT/US2022/073934—ISA/EPO—Nov. 14, 2022.

* cited by examiner

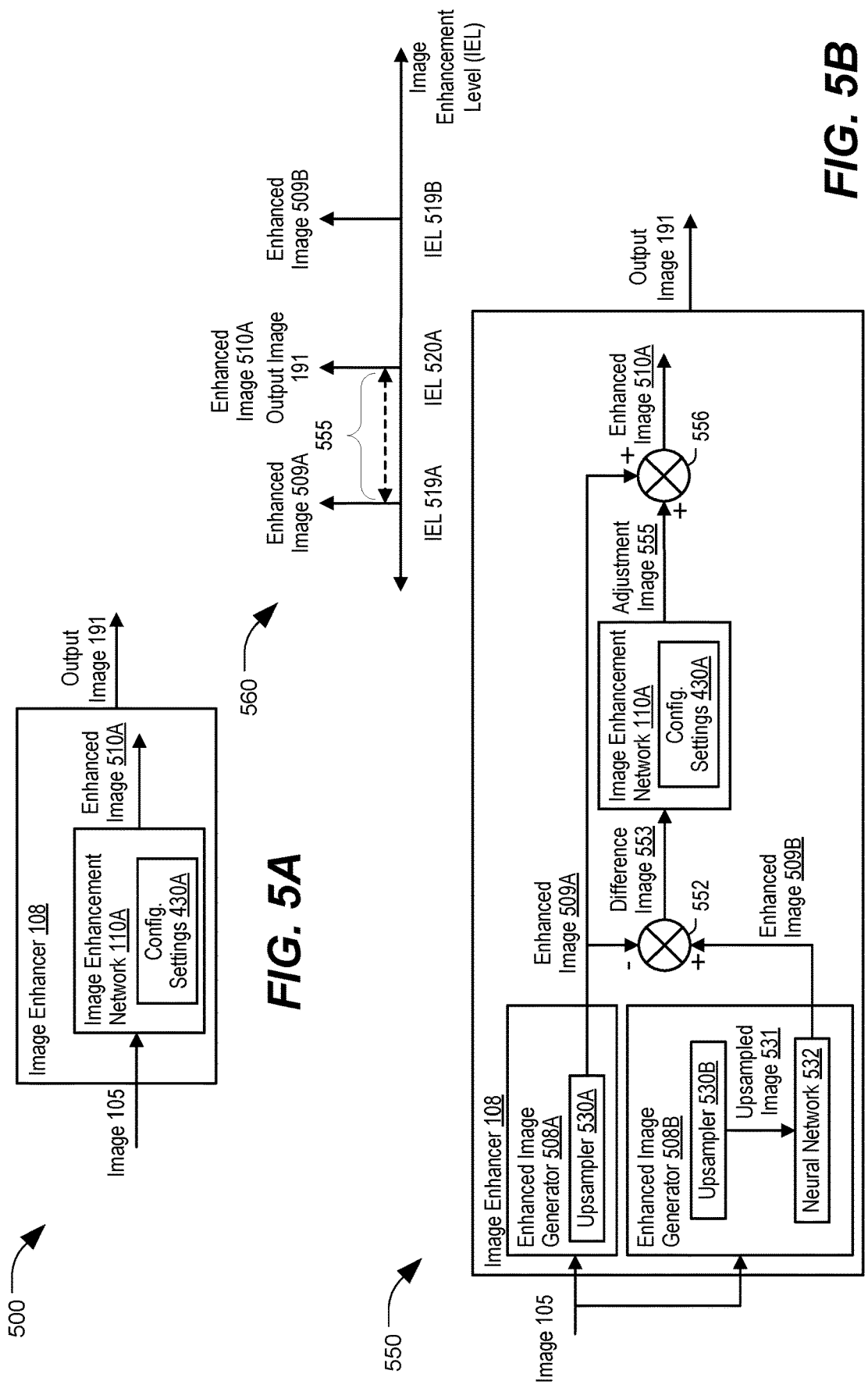

CONFIGURABLE IMAGE ENHANCEMENT

I. FIELD

The present disclosure is generally related to configurable image enhancement.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to receive and display images. For example, an image stream may represent video content received (e.g., downloaded) from another device. The image stream may include compressed images to meet transmission bandwidth limitations. Neural network based upscalers can be used to generate more realistic textures and sharper details on compressed high-quality videos as compared to other types of upscalers that do not compensate for loss of texture and detail. Such neural network based upscalers can be trained using Generative Adversarial Network (GAN) techniques. However, GAN networks mishandle compression artifacts and enhance such artifacts, making them more distracting to a viewer as compared to other types of upscalers. A single network cannot provide satisfactory upscaling to both high quality images and heavily compressed images.

III. SUMMARY

According to one implementation of the present disclosure, a device includes a memory and one or more processors. The memory is configured to store an image enhancement network of an image enhancer. The one or more processors are configured to predict an image compression quality of an image of a stream of images. The one or more processors are also configured to configure the image enhancer based on the image compression quality. The one or more processors are further configured to process, using the image enhancement network of the configured image enhancer, the image to generate an enhanced image. According to another implementation of the present disclosure, a method includes predicting, at a device, an image compression quality of an image of a stream of images. The method also includes configuring, at the device, an image enhancer based on the image compression quality. The method further includes processing, using an image enhancement network of the configured image enhancer, the image to generate an enhanced image.

According to another implementation of the present disclosure, a non-transitory computer-readable medium stores instructions that, when executed by one or more processors, cause the one or more processors to predict an image compression quality of an image of a stream of images. The instructions, when executed by the one or more processors, also cause the one or more processors to configure an image enhancer based on the image compression quality. The instructions, when executed by the one or more processors, further cause the one or more processors to process, using an image enhancement network of the configured image enhancer, the image to generate an enhanced image.

According to another implementation of the present disclosure, an apparatus includes means for predicting an image compression quality of an image of a stream of images. The apparatus also includes means for configuring an image enhancer based on the image compression quality. The apparatus further includes means for processing, using an image enhancement network of the configured image enhancer, the image to generate an enhanced image.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

FIG. 5A is a diagram of an illustrative aspect of an image enhancer of the system of FIG. 1, in accordance with some examples of the present disclosure.

FIG. 5B is a diagram of another illustrative aspect of the image enhancer of the system of FIG. 1, in accordance with some examples of the present disclosure.

V. DETAILED DESCRIPTION

Neural network based upscalers can generate more realistic textures and sharper details on compressed high-quality videos as compared to other types of upscalers. Such neural network based upscalers are trained using Generative Adversarial Network (GAN) techniques. However, GAN networks mishandle compression artifacts and enhance them, making the compression artifacts more distracting after enhancement as compared to other types of upscalers. A single network cannot provide satisfactory upscaling to both high quality images and heavily compressed images.

Systems and methods of performing configurable image enhancement are disclosed. For example, an image compression quality estimator is configured to estimate an image compression quality of a portion of an input image. An image enhancement configurer configures an image enhancer based on the estimated image compression quality. In an example, the image enhancement configurer, based on determining that the estimated image compression quality is greater than a threshold compression quality, configures the image enhancer to use a first neural network (e.g., a GAN network) corresponding to a higher enhancement level. Alternatively, the image enhancer configurer, based on determining that the estimated image compression quality is less than or equal to the threshold compression quality, configures the image enhancer to use a second neural network, such as a bilinear upscaler or another type of neural network trained not to enhance compression artifacts. In another example, the image enhancement configurer configures the image enhancer by "tuning" an image enhancement network based on the estimated image compression quality. To illustrate, the image enhancement configurer adjusts configuration settings (e.g., weights, biases, or both) of the image enhancement network based on the estimated image compression quality. The configured image enhancer is used to process the input image to generate an output image. Configuring the image enhancer based on estimated compression quality improves enhancement results. For example, the configured image enhancer performs higher level of enhancement on higher compression quality images to generate more enhanced output images, and performs lower level of enhancement on lower compression quality images to reduce the impact of compression artifacts in the enhanced output images.

Figure 1:
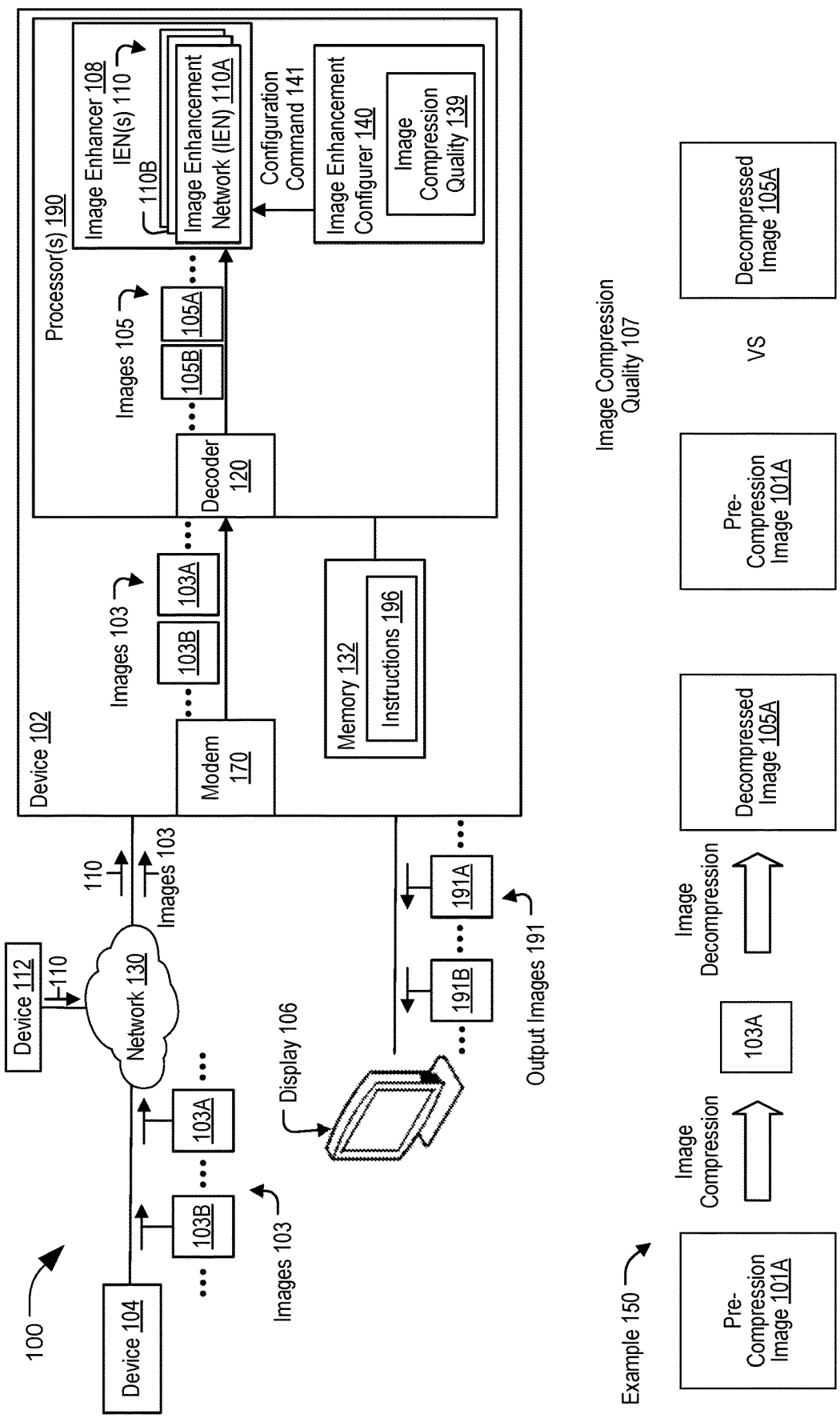
FIG. 1 is a block diagram of a particular illustrative aspect of a system operable to perform configurable image enhancement, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 190 of FIG. 1), which indicates that in some implementations the device 102 includes a single processor 190 and in other implementations the device 102 includes multiple processors 190.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system configured to perform configurable image enhancement is disclosed and generally designated 100. The system 100 includes a device 102 that is coupled to a display device 106. In a particular aspect, the device 102 is coupled via a network 130 to a device 104, a device 112, or both. The device 102 is configured to perform configurable image enhancement using an image enhancement configurer 140 and an image enhancer 108.

The device 102 includes one or more processors 190 coupled to a memory 132. In a particular aspect, the one or more processors 190 include a decoder 120 (e.g., an image decompressor). In a particular aspect, the device 102 includes a modem 170 coupled to the memory 132, to the one or more processors 190, or a combination thereof. In a particular aspect, the modem 170 is configured to enable communication with the device 112. For example, the modem 170 is configured to receive one or more image enhancement networks (IEN(s)) 110 via the network 130 from the device 112. In a particular aspect, the modem 170 is configured to store the one or more image enhancement networks 110 in the memory 132, provide the one or more image enhancement networks 110 to the one or more processors 190, or a combination thereof.

In a particular aspect, the modem 170 is configured to enable communication with the device 104. For example, the modem 170 is configured to receive a stream of one or more images 103 via the network 130 from the device 104. To illustrate, the modem 170 is configured to receive a bitstream of the one or more images 103 (e.g., encoded images), and the decoder 120 is configured to decode the bitstream to generate one or more images 105. In a particular aspect, the modem 170 is configured to store the one or more images 103 in the memory 132, provide the one or more images 103 to the one or more processors 190, or a combination thereof. In a particular aspect, the decoder 120 is configured to store the one or more images 105 in the memory 132.

The one or more processors 190 include the image enhancement configurer 140 coupled to the image enhancer 108. The image enhancement configurer 140 is configured to estimate an image compression quality 139 of an image 105 (e.g., a decompressed image), and to configure the image enhancer 108 based on the image compression quality 139. The image enhancer 108 is configured to generate one or more output images 191 (e.g., enhanced images) by using at least one of the one or more image enhancement networks 110 to process the one or more images 105.

In a particular aspect, the memory 132 is configured to store instructions 196 that are executable by the one or more processors 190 to perform one or more operations described herein. In a particular aspect, the memory 132 is configured to store data used or generated during performance of one or more operations described herein. For example, the memory 132 is configured to store the one or more image enhancement networks 110, the one or more images 103, the one or more images 105, the one or more output images 191, an image compression quality metric indicating the image compression quality 139, or a combination thereof.

In some implementations, the device 102 corresponds to or is included in one of various types of devices. In an illustrative example, the one or more processors 190 is integrated in at least one of a mobile phone or a tablet computer device, as described with reference to FIG. 8, a wearable electronic device, as described with reference to FIG. 9, or a virtual reality, mixed reality, or augmented reality headset, as described with reference to FIG. 10. In another illustrative example, the one or more processors 190 is integrated into a vehicle, such as described further with reference to FIG. 11 and FIG. 12.

During operation, the one or more processors 190 process the one or more images 105. In an example, the one or more processors 190 process a stream of images including the one or more images 105. In a particular implementation, the one or more images 105 correspond to an image stream of a video or a photo burst. In a particular aspect, the device 102 receives the one or more images 103 (e.g., encoded images) from the device 104, and the decoder 120 decodes (e.g., decompresses) the one or more images 103 to generate the one or more images 105.

In an example 150, the device 104 performs image compression (e.g., encoding) on a pre-compression image 101A to generate an image 103A (e.g., a compressed image), and the device 102 performs image decompression (e.g., decoding) on the image 103A (e.g., the compressed image) to generate a decompressed image 105A. In a particular example, the pre-compression image 101A is pre-processed (e.g., downsampled) to generate a pre-processed (e.g., downsampled) image and the pre-processed image is encoded to generate the image 103A (e.g., a compressed image). In a particular example, the pre-processing can include downsampling a video to generate a lower resolution video and the image compression can include encoding the lower resolution video at a video encoder to generate an encoded video (e.g., a bitstream). To illustrate, the encoded video includes the image 103A (e.g., a compressed image). Performing the image decompression can include decoding the encoded video at a video decoder to reconstruct the lower resolution video. To illustrate, the lower resolution video includes the decompressed image 105A.

A difference between the pre-compression image 101A and the decompressed image 105A indicates an image compression quality 107 of the image 105A. For example, fewer differences between the pre-compression image 101A and the decompressed image 105A indicates fewer compression artifacts in the image 105A. The image enhancer 108 is to perform image enhancement (e.g., upsampling) on the image 105A to generate an output image 191A. Upsampling is provided as an illustrative example of image enhancement. In some examples, performing the image enhancement can include texturizing, smoothening, changing color, sharpening, adding contrast, or another type of enhancement.

The image enhancement configurer 140 predicts an image compression quality 139 of the image 105A, as further described with reference to FIG. 2. In a particular aspect, the image compression quality 139 indicates a predicted amount of compression artifacts included in the image 105A. The image compression quality 139 is an estimate of the image compression quality 107 and may be generated when the image 105A is available for processing by the one or more processors 190 at the device 102 but the pre-compression image 101A is unavailable to the one or more processors 190. In an illustrative example, the pre-compression image 101A is unavailable to the device 102 for determining the image compression quality 107 because the device 104 transmits the image 103A instead of the pre-compression image 101A to conserve bandwidth. Since the pre-compression image 101A is unavailable to the one or more processors 190, the one or more processors 190 predict the image compression quality 139 as an estimate of the image compression quality 107. In an alternative aspect, the one or more processors 190 perform enhancement of the image 105A independently of whether the image 105A is a decompressed image or an original image. In this aspect, the image compression quality 139 is an estimate of the image compression quality 107 as if the image 105A had been generated from the image 103A (e.g., a compressed version of a pre-compression image 101A) even though the image 105A may be actually independent of any pre-compression image. In an illustrative example, the image 105A is generated (e.g., by a camera or a graphics processing unit (GPU)) for display at a first resolution (e.g., at a phone screen), and the one or more processors 190 perform enhancement of the image 105A for display at a higher resolution at the display device 106 (e.g., a projection screen).

The one or more processors 190 receiving the one or more images 103 via the modem 170 from the device 104 and decompressing (e.g., decoding) the one or more images 103 to generate one or more images 105 is provided as an illustrative example. In some examples, a component (e.g., a camera or a GPU) integrated in or coupled to the device 102 generates the one or more images 105. As an example, the one or more images 105 can be generated at a reduced resolution by a gaming engine at the device 102 and enhanced by the image enhancer 108 prior to display at the display device 106. In a particular aspect, the one or more processors 190 retrieve the one or more images 105 from the memory 132.

The image enhancement configurer 140 configures the image enhancer 108 based on the image compression quality 139, as further described with reference to FIG. 4. According to some aspects, the image enhancement configurer 140 generates a configuration command 141 based on the image compression quality 139 and sends the configuration command 141 to the image enhancer 108 to configure the image enhancer 108, as further described with reference to FIG. 4. In some examples, the configuration command 141 selects an image enhancement network (IEN) 110A from the one or more image enhancement networks 110, to be used to process the image 105A. In another example, the configuration command 141 sets a particular enhancement level of a "tunable" image enhancement network 110A to be used to process the image 105A. To illustrate, the configuration command 141 may adjust one or more weights of the image enhancement network 110A based on the image compression quality 139. In a particular aspect, the image enhancement configurer 140, in response to determining that the image compression quality 139 is greater than a threshold compression quality, generates the configuration command 141 to select or tune the image enhancement network 110A to perform image enhancement corresponding to a higher enhancement level.

The image enhancer 108 (e.g., the configured image enhancer) processes, using the image enhancement network 110A, the image 105A to generate an output image 191A (e.g., an enhanced image), such as further described with reference to FIGS. 5A-C. To illustrate, the image enhancer 108 uses the image enhancement network 110A to perform one or more of upscaling, texturizing, smoothening, changing color, sharpening, adding contrast, or another type of enhancement to the image 105A to generate the output image 191A. In a particular aspect, the image enhancer 108 stores the output image 191A in the memory 132 or a storage device. In a particular aspect, the image enhancer 108 outputs one or more output images 191 (e.g., including the output image 191A) to the display device 106, another device, or a combination thereof.

In a particular aspect, the image enhancement configurer 140 enables switching between enhancement levels during processing of the images 105. In an illustrative example, the image 105A has low image compression quality (e.g., the image compression quality 139 is less than or equal to a threshold compression quality) and the image enhancement configurer 140 generates the configuration command 141 to select or tune the image enhancement network 110A (e.g., a bilinear upscaler) for lower level enhancement. The image enhancement network 110A is used to process the image 105A to generate the output image 191A. In a particular aspect, one or more additional images of the images 105 are also processed using the image enhancement network 110A.

The image enhancement configurer 140 determines that an image 105B is subsequent to the image 105A in the images 105 and has high image compression quality (e.g., greater than the threshold compression quality). The image enhancement configurer 140 generates the configuration command 141 to select or tune an image enhancement network 110B for higher level enhancement. The image enhancement network 110B is used to process the image 105B to generate the output image 191B. In a particular aspect, one or more additional images of the images 105 are also processed using the image enhancement network 110B. In a particular aspect, the image enhancement network 110A (e.g., a bilinear upscaler) is a different neural network than the image enhancement network 110B (e.g., a GAN network). In an alternative aspect, the image enhancement network 110A is the same neural network tuned to have different configuration settings as the image enhancement network 110B.

The system 100 thus enables configuration of image enhancement based on estimated compression quality for improved enhancement results. For example, the image enhancement configurer 140 generates the configuration command 141 to select or tune an image enhancement network with a first enhancement level corresponding to improved texture for images having higher compression quality or with a second enhancement level corresponding to reduced compression artifacts for images having lower compression quality.

Although the display device 106 is illustrated as being coupled to the device 102, in other implementations the display device 106 may be integrated in the device 102. Although the device 102 is described as receiving the one or more image enhancement networks 110 from the device 112 via the network 130, in other implementations the device 112 may be omitted, and the device 102 may generate the one or more image enhancement networks 110. Although the device 102 is described as generating the one or more images 105 by decompressing the one or more images 103 received from the device 104 via the network, in other implementations the device 104 may be omitted, and the device 102 may generate the one or more images 105, retrieve the one or more images 105 from local storage, receive the one or more images 105 from a component (e.g., a camera) integrated in or coupled to the device 102, or a combination thereof.

Figure 2:
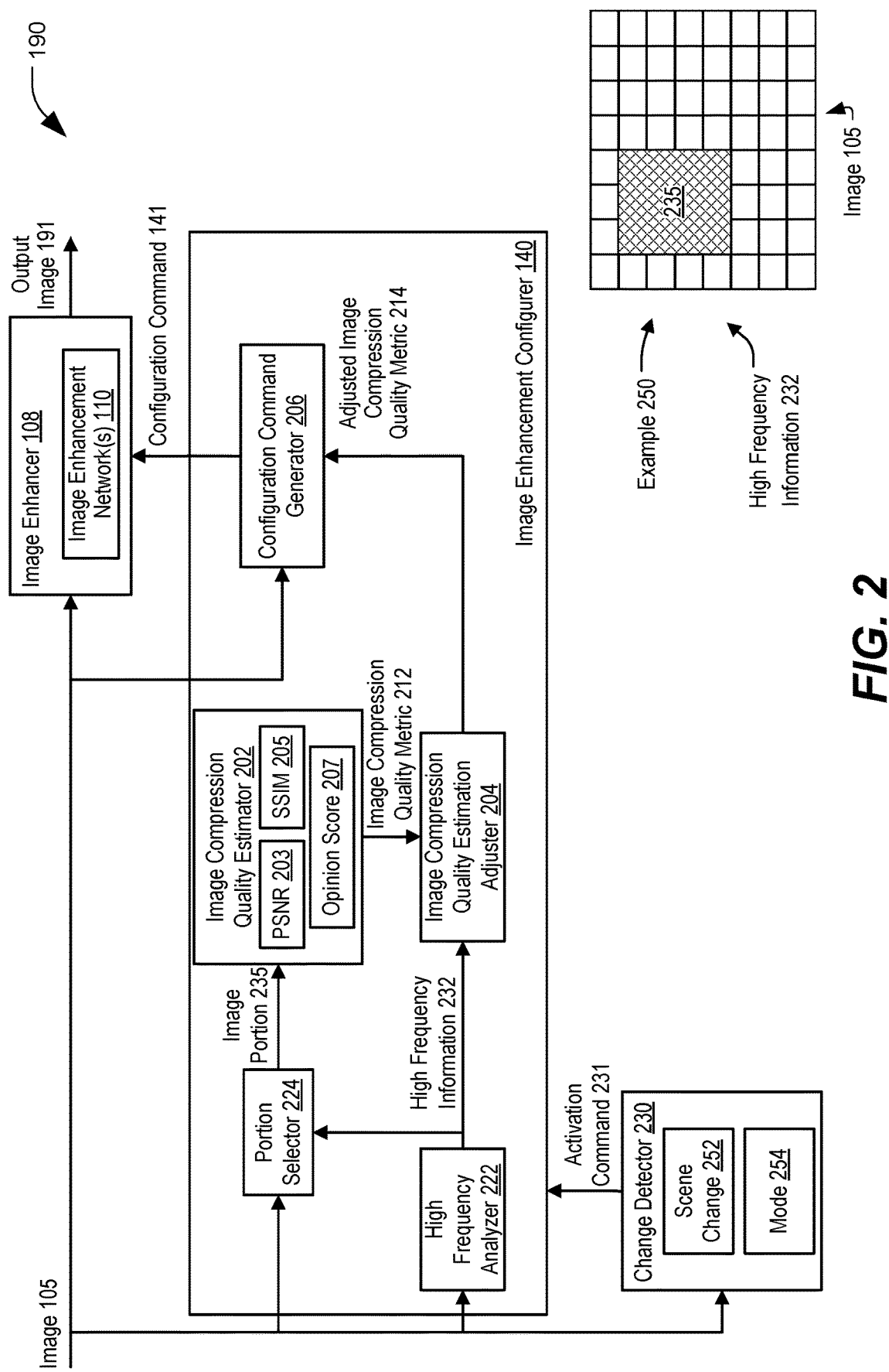
FIG. 2 is a diagram of an illustrative aspect of the one or more processors of the system of FIG. 1, in accordance with some examples of the present disclosure.

FIG. 2 is a diagram 200 of an illustrative aspect of the one or more processors 190. In a particular aspect, the one or more processors 190 include a change detector 230 coupled to the image enhancement configurer 140. In a particular aspect, the change detector 230 is configured to operate in an always-on power domain of the one or more processors 190, and the image enhancement configurer 140 is configured to operate in a second power domain, such as an on-demand power domain, of the one or more processors 190.

The change detector 230 is configured to generate an activation command 231 (e.g., a wakeup signal or an interrupt) to activate the image enhancement configurer 140. In an example, the activation command 231 is configured to transition the second power domain from a low-power mode to an active mode to activate the image enhancement configurer 140.

In an example, the change detector 230 sends the activation command 231 to activation circuitry that includes or is coupled to power management circuitry, clock circuitry, head switch or foot switch circuitry, buffer control circuitry, or any combination thereof. The activation circuitry may be configured to initiate powering-on of the image enhancement configurer 140, such as by selectively applying or raising a voltage of a power supply of the image enhancement configurer 140, of the second power domain, or both. As another example, the activation circuitry may be configured to selectively gate or un-gate a clock signal to the image enhancement configurer 140, such as to prevent or enable circuit operation without removing a power supply.

The image enhancement configurer 140 includes a high frequency analyzer 222 that is coupled via a portion selector 224 to an image compression quality estimator 202. Each of the image compression quality estimator 202 and the high frequency analyzer 222 is coupled via an image compression quality estimation adjuster 204 to a configuration command generator 206. The configuration command generator 206 is coupled to the image enhancer 108.

During operation, the change detector 230 detects a change in response to detecting a scene change 252 based on a comparison of an image 105 (e.g., the image 105A or 105B of FIG. 1) with a previous image in a stream or sequence of images, detecting a change in a mode 254 (e.g., an operating mode) of the device 102, detecting expiration of a timer since a previous configuration change of the image enhancer 108, detecting that at least a threshold count of images have been processed since the previous configuration change of the image enhancer 108, or a combination thereof. Having the change detector 230 detect change based on the expiration of the timer, at least the threshold count of images have been processed, or both, adds hysteresis to image enhancer configuration to enable prevention of frequent configuration changes that may be noticeable to a person viewing the one or more output images 191. The change detector 230 enables resources to be conserved by using the image enhancement configurer 140 to process a subset of the one or more images 105 as compared to processing each of the one or more images 105. The change detector 230, in response to detecting the change, sends an activation command 231 to the image enhancement configurer 140.

The image enhancement configurer 140 processes the image 105 in response to receiving the activation command 231. For example, the high frequency analyzer 222 generates high frequency information 232 indicating one or more high frequency portions of the image 105. For example, the high frequency analyzer 222 applies a transform (e.g., a Discrete Fourier Transform (DFT)) to the image 105 to generate image frequency data. To illustrate, applying the transform performs a conversion on the image 105 in the spatial domain to generate the image frequency data in the frequency domain. In a particular aspect, the high frequency analyzer 222 applies a filter (e.g., a high-pass filter) to the image frequency data to generate filtered image frequency data that includes image content corresponding to frequencies greater than a threshold frequency. In a particular aspect, the high frequency analyzer 222 applies an inverse transform (e.g., an inverse DFT) to the filtered image frequency data to generate a high frequency image including the one or more high frequency portions of the image 105. The high frequency analyzer 222 generates, based on the high frequency image, the high frequency information 232 indicating the one or more high frequency portions of the image 105.

In an example 250, the high frequency information 232 indicates that an image portion 235 of the image 105 corresponds to a high frequency portion. In a particular aspect, the image 105 includes multiple high frequency portions and the image portion 235 corresponds to a largest high frequency portion of the image 105, a highest frequency portion of the high frequency portions, or both.

In a particular implementation, the high frequency analyzer 222 applies a transform to the image 105 to generate image frequency data and applies a filter (e.g., a high-pass filter) to the image frequency data to generate the high frequency information 232 (e.g., L1 norm of the output of the high-pass filter). In a particular aspect, the output of the high-pass filter includes multiple portions of the image 105 and the high frequency information 232 indicates the multiple portions and the frequency information (e.g., L1 norm) of each of the multiple portions. The high frequency analyzer 222 provides the high frequency information 232 to the portion selector 224, the image compression quality estimation adjuster 204, or both.

In a particular aspect, the portion selector 224 selects the image portion 235 of the image 105 based on the high frequency information 232. For example, the portion selector 224 selects the image portion 235 in response to determining that the high frequency information 232 indicates that the image 105 includes one or more high frequency portions and that the image portion 235 is the largest one of the one or more high frequency portions, corresponds to a highest frequency portion (e.g., highest L1 norm) of the one or more high frequency portions, or both. In a particular aspect, the high frequency information 232 indicates that the image 105 does not include any high frequency portions (e.g., does not include any portions having frequencies greater than a threshold frequency). In a particular implementation, the portion selector 224 selects the image 105 as the image portion 235 in response to determining that the high frequency information 232 indicates that the image 105 does not include any high frequency portions. For example, when the image 105 does not include any high frequency portions, the entire image 105 is provided as input to the image compression quality estimator 202. In a particular aspect, the portion selector 224 crops the image portion 235 from the image 105. In some implementations, in addition to processing the high-frequency information 232 to determine the portion 235, the portion selector 224 performs a color space conversion on the image portion 235 or the image 105 to a particular color space (e.g., red green blue (RGB)). The portion selector 224 provides the image portion 235 (e.g., converted to the particular color space) to the image compression quality estimator 202.

The image compression quality estimator 202 determines an image compression quality metric 212 based on the image portion 235. In a particular aspect, determining the image compression quality metric 212 based on the image portion 235 and independently of the remaining portions of the image 105 conserves resources (e.g., uses fewer computing cycles, less power, and less time). In a particular aspect, low-frequency portions (e.g., single color background regions) correspond to a high peak-signal-to-noise ratio (PSNR) value. Determining the image compression quality metric 212 based on the image portion 235 independently of the remaining portions of the image 105 increases accuracy of the image compression quality metric 212 by preventing the low-frequency portions of the image 105 from skewing the image compression quality metric 212.

In a particular aspect, the image compression quality metric 212 indicates a PSNR 203, a structural similarity index measure (SSIM) 205, an opinion score 207, or a combination thereof, of the image portion 235. In a particular aspect, the image compression quality estimator 202 determines the peak signal-to-noise ratio 203 by performing a signal-to-noise analysis of the image portion 235, determines the structural similarity index measure 205 by performing a structural similarity analysis of the image portion 235, or both. Alternatively, or in addition, the opinion score 207 is based on a user opinion regarding compression quality of the image 105. For example, the image compression quality estimator 202 determines the opinion score 207 by accessing survey results, receiving a user input via a user interface from a user of the device 102, or both. In a particular aspect, the image compression quality estimator 202 uses a neural network to process the image portion 235 (or the image 105) to generate the image compression quality metric 212. For example, the image compression quality estimator 202 uses the neural network to process the image portion 235 (or the image 105) to generate (e.g., predict) the peak signal-to-noise ratio 203, the structural similarity index measure 205, the opinion score 207, or a combination thereof, associated with the image portion 235, the image 105, or both. In a particular aspect, generating the image compression quality metric 212 corresponds to estimating (e.g., predicting) the image compression quality 139 of FIG. 1. The image compression quality estimator 202 provides the image compression quality metric 212 to the image compression quality estimation adjuster 204.

The image compression quality estimation adjuster 204 generates an adjusted image compression quality metric 214 (e.g., an adjusted PSNR, an adjusted SSIM, an adjusted opinion score, or a combination thereof) based on the image compression quality metric 212. As an illustrative example, higher compression corresponds to lower PSNR for the same content. However, in addition to compression levels, PSNR can also vary based on content. For example, higher frequency regions correspond to lower PSNR. In a particular implementation, to improve accuracy of the image compression quality metric 212 (e.g., the PSNR 203), the image compression quality estimation adjuster 204 adjusts the image compression quality metric 212 based on the high frequency information 232 of the image 105 to generate the adjusted image compression quality metric 214. In an illustrative, non-limiting example, the image compression quality estimation adjuster 204 determines the adjusted image compression quality metric 214 by adjusting the image compression quality metric 212 based on the following Equation:

$$F_{NN}(P)+\alpha(\sqrt{\|HPF(P)\|_1}+\beta),\qquad \text{Equation 1}$$

where $F_{NN}(P)$ corresponds to the image compression quality metric 212 and $\|HPF(P)\|_1$ corresponds to the L1 norm of the output of a high-pass filtering operation applied to the image portion 235 (e.g., $\|HPF(P)\|_1$ corresponds to the high frequency information 232), and $\alpha$ and $\beta$ correspond to parameters that are based on training data, default data, user input, a configuration setting, or a combination thereof.

Figure 3:
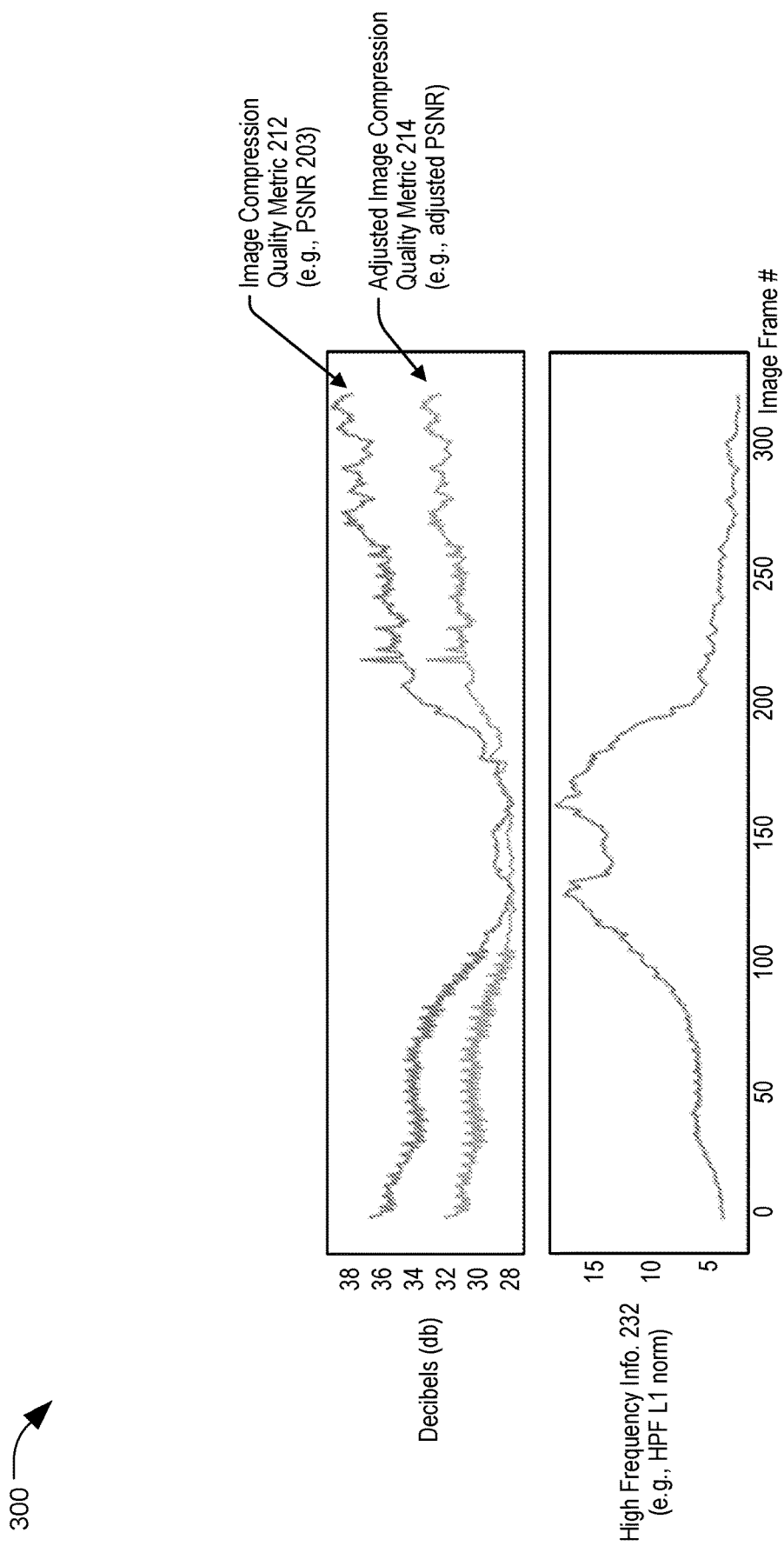
FIG. 3 is a diagram of an illustrative example of an image compression quality metric and an adjusted image compression quality metric generated by the system of FIG. 1, in accordance with some examples of the present disclosure.

A diagram 300 of examples of the image compression quality metric 212 and the adjusted image compression quality metric 214 for the one or more images 105 are shown in FIG. 3. The specific axes values shown in the diagram 300 are provided for illustration and are not to be construed as limiting. The image compression quality estimation adjuster 204 generates the adjusted image compression quality metric 214 that is lower than the image compression quality metric 212 for an image 105 with lower high frequency information 232 (e.g., a lower L1 norm of the output of the high-pass filter (HPF)). For example, image portions with high frequency content are more prone to compression distortion and therefore have a lower PSNR compared to low frequency areas. The image compression quality estimation adjuster 204 reduces the PSNR corresponding to the low frequency areas, increases the PSNR corresponding to the high frequency content, or both, to generate the adjusted image compression quality metric 214. A difference between the image compression quality metric 212 and the adjusted image compression quality metric 214 is based on the high frequency information 232 of the image 105. For example, a lower value of the high frequency information 232 corresponds to a greater difference between the image compression quality metric 212 and the adjusted image compression quality metric 214. In a particular aspect, the adjusted image compression quality metric 214 indicates the image compression quality 139 of FIG. 1.

Returning to FIG. 2, the image compression quality estimation adjuster 204 provides the adjusted image compression quality metric 214 to the configuration command generator 206. The configuration command generator 206 generates a configuration command 141 based on the adjusted image compression quality metric 214, the image 105, or both, as further described with reference to FIG. 4. The configuration command generator 206 provides the configuration command 141 to the image enhancer 108 to configure the image enhancer 108, as further described with reference to FIG. 4. The image enhancer 108 (e.g., subsequent to configuration) processes the image 105 to generate an output image 191, as further described with reference to FIGS. 5A-C. In a particular aspect, the image enhancer 108 (as configured) processes a first subset of the one or more images 105 to generate a first subset of the one or more output images 191. Subsequently the change detector 230 may send another activation command to the image enhancement configurer 140 to reconfigure the image enhancer 108. The image enhancer 108 (as reconfigured) processes a second subset of the one or more images 105 to generate a second subset of the one or more output images 191.

In a particular aspect, the image enhancer 108 can be reconfigured multiple times based on image content during processing of a single input stream (e.g., corresponding to a single video or a single playback session). By selectively activating the image enhancement configurer 140 based on a result of processing image data at the change detector 230, overall power consumption associated performing configurable image enhancement may be reduced.

Figure 4:
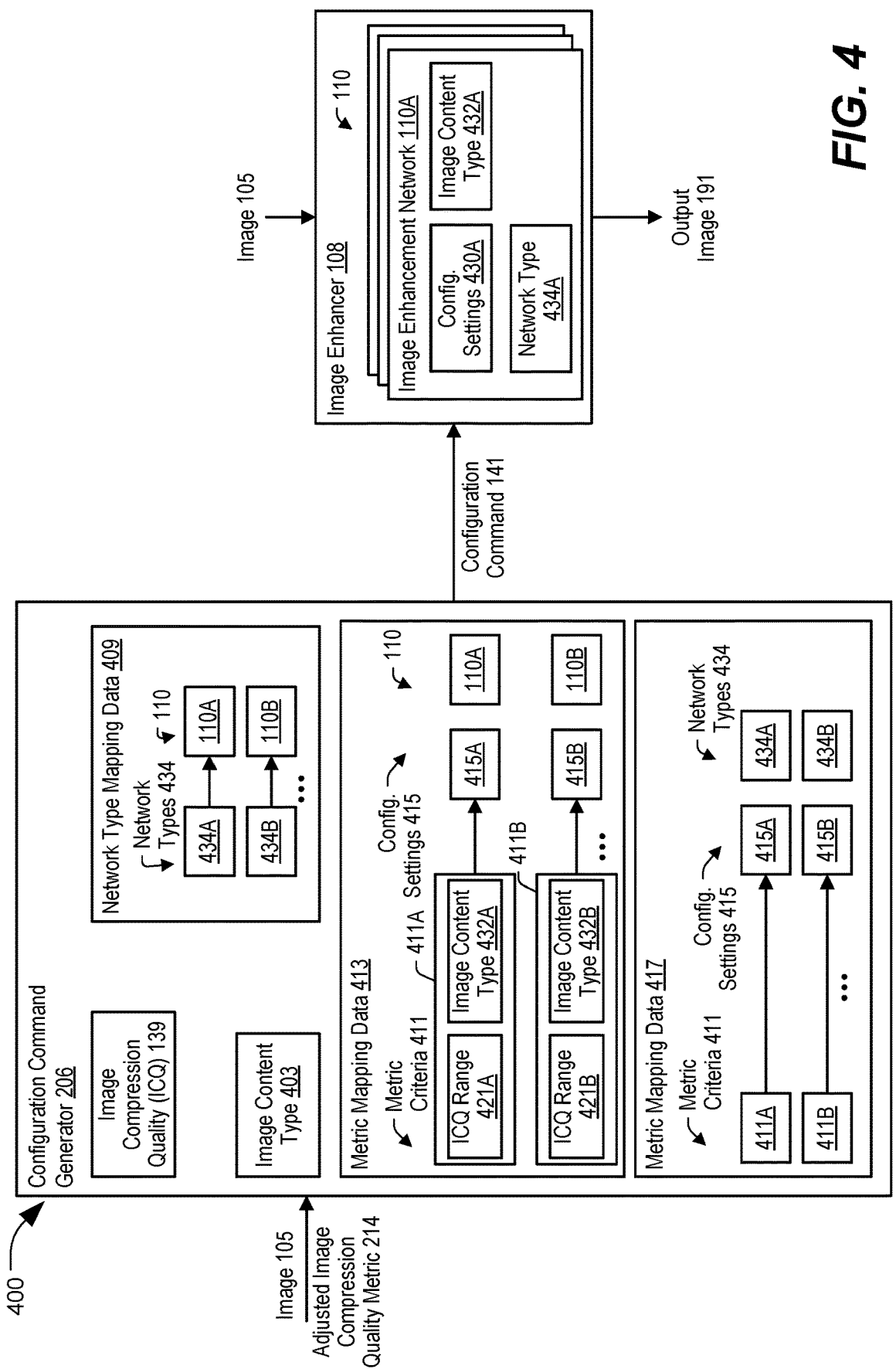
FIG. 4 is a diagram of an illustrative aspect of components of the system of FIG. 1, in accordance with some examples of the present disclosure.

Referring to FIG. 4, a diagram 400 of a particular implementation of the configuration command generator 206 and the image enhancer 108 is shown. In a particular aspect, the adjusted image compression quality metric 214 is received by the configuration command generator 206 and indicates the image compression quality (ICQ) 139 of the image 105.

In a particular aspect, the configuration command generator 206 determines that the image 105 has an image content type 403 (e.g., "outdoors," "indoors," "daytime," "nighttime," "portrait," "landscape," or a combination thereof). For example, the configuration command generator 206 determines that metadata associated with the image 105 indicates that the image 105 has the image content type 403. As another example, the configuration command generator 206 determines the image content type 403 by using various content analysis techniques to analyze the image 105.

The configuration command generator 206 has access to mapping data that maps metric criteria 411 (image compression quality ranges 421, image content types 432, or both) to image enhancement networks 110, image enhancement network types 434, configuration settings 415, or a combination thereof. For example, the configuration command generator 206 has access to metric mapping data 413 that maps the metric criteria 411 to the image enhancement networks 110, the configuration settings 415, or a combination thereof. In another example, the configuration command generator 206 has access to metric mapping data 417 that maps the metric criteria 411 to the network types 434, the configuration settings 415, or a combination thereof. In this example, the configuration command generator 206 also has access to network type mapping data 409 that maps the network types 434 (e.g., "trained based on pixel-wise loss," "trained based on a GAN technique," "L1 loss trained," "L1 loss+extra penalty for higher frequencies trained," or other network types) to the image enhancement networks 110.

In an illustrative example, particular metric criteria 411 corresponding to a lower compression quality are mapped to an image enhancement network, an image enhancement network type (e.g., associated with neural network training based on L1 loss and extra penalty for high frequencies), configuration settings, or both, corresponding to a lower enhancement level. Alternatively, particular metric criteria 411 corresponding to a medium compression quality map to an image enhancement network, an image enhancement network type (e.g., associated with neural network training based on L1 loss independently of extra penalty for high frequencies), configuration settings, or both, corresponding to a medium enhancement level. In a particular aspect, particular metric criteria 411 corresponding to a higher compression quality map to an image enhancement network, an image enhancement network type (e.g., associated with GAN based neural network training), configuration settings, or both, corresponding to a higher enhancement level.

The configuration command generator 206, in response to determining that a particular metric criterion of the metric criteria 411 is satisfied, selects the corresponding image enhancement network 110, the corresponding configuration settings 415, or a combination thereof. In a particular aspect, metric criterion 411A of the metric criteria 411 indicates an ICQ range 421A (e.g., from a first ICQ threshold to a second ICQ threshold), an image content type 432A, or both. The configuration command generator 206 determines that the metric criterion 411A is satisfied in response to determining that the ICQ 139 matches the ICQ range 421A (e.g., is greater than or equal to the first ICQ threshold and less than the second ICQ threshold), that the image content type 403 matches (e.g., is the same as or is a subtype of) the image content type 432A, or both.

In a particular aspect, the configuration command generator 206, in response to determining that metric criterion 411A is satisfied and that the metric mapping data 413 indicates that the metric criterion 411A corresponds to the image enhancement network 110A, configuration settings 415A, or both, selects the image enhancement network 110A, the configuration settings 415A, or both. In an alternative aspect, the configuration command generator 206, in response to determining that the metric criterion 411A is satisfied, that the metric mapping data 417 indicates that the metric criterion 411A corresponds to the configuration settings 415A, a network type 434A, or both, selects the configuration settings 415A, the network type 434A, or both. The configuration command generator 206, in response to determining that the network type 434A is selected and that the network type mapping data 409 indicates that the network type 434A corresponds to the image enhancement network 110A, selects the image enhancement network 110A. The configuration command generator 206 generates the configuration command 141 indicating the selected image enhancement network 110A, the selected configuration settings 415A, or both. For example, the configuration command generator 206 generates the configuration command 141 to select the image enhancement network 110A at the image enhancer 108, to tune the image enhancement network 110A based on the configuration settings 415A at the image enhancer 108, or both.

The image enhancer 108, in response to receiving the configuration command 141 indicating that the image enhancement network 110A is selected, selects the image enhancement network 110A for processing the image 105. In a particular aspect, the image enhancer 108, in response to determining that the configuration command 141 indicates that the image enhancement network 110A is to be tuned based on the configuration settings 415A, updates the configuration settings 430A of the image enhancement network 110A based on the configuration settings 415A. In a particular aspect, the configuration settings 430 correspond to an enhancement level (e.g., enhancement strength) of the image enhancement network 110A and updating the configuration settings 430 adjusts the enhancement level of the image enhancement network 110A. The configured image enhancer 108 uses the image enhancement network 110A to process the image 105 to generate the output image 191, as further described with reference to FIGS. 5A-C. In a particular aspect, the image enhancer 108 continues to use the image enhancement network 110A to process one or more subsequent images of the one or more images 105 until the image enhancer 108 is reconfigured.

In a particular aspect, the metric mapping data 413, 417 indicate one or more additional mappings. For example, metric criterion 411B of the metric criteria 411 indicates an ICQ range 421B, an image content type 432B, or both. In a particular aspect, the metric criterion 411B is distinct from the metric criterion 411A. For example, at least one of the ICQ range 421B or the image content type 432B is distinct from the corresponding one of the ICQ range 421A or the image content type 432A.

Having multiple distinct criteria enables the configuration command generator 206 to select different configuration commands for images having different characteristics. To illustrate, the metric mapping data 413 indicates that the metric criterion 411B maps to configuration settings 415B, an image enhancement network 110B, or both. As another illustration, the metric mapping data 417 indicates that the metric criterion 411B maps to the configuration settings 415B, a network type 434B, or both, and the network type mapping data 409 indicates that the network type 434B maps to the image enhancement network 110B. In response to determining that the metric criterion 411B is satisfied, the configuration command generator 206 selects the image enhancement network 110B, the configuration settings 415B, or both, based on the metric mapping data 413, the metric mapping data 417, the network type mapping data 409, or a combination thereof, and generates the configuration command 141 indicating the selected image enhancement network 110B, the selected configuration settings 415B, or both. The image enhancer 108, in response to receiving the configuration command 141 indicating that the image enhancement network 110B, the configuration settings 415B, both are selected, selects the image enhancement network 110B, the configuration settings 415B, or both, for processing the image 105.

Figure 5C:
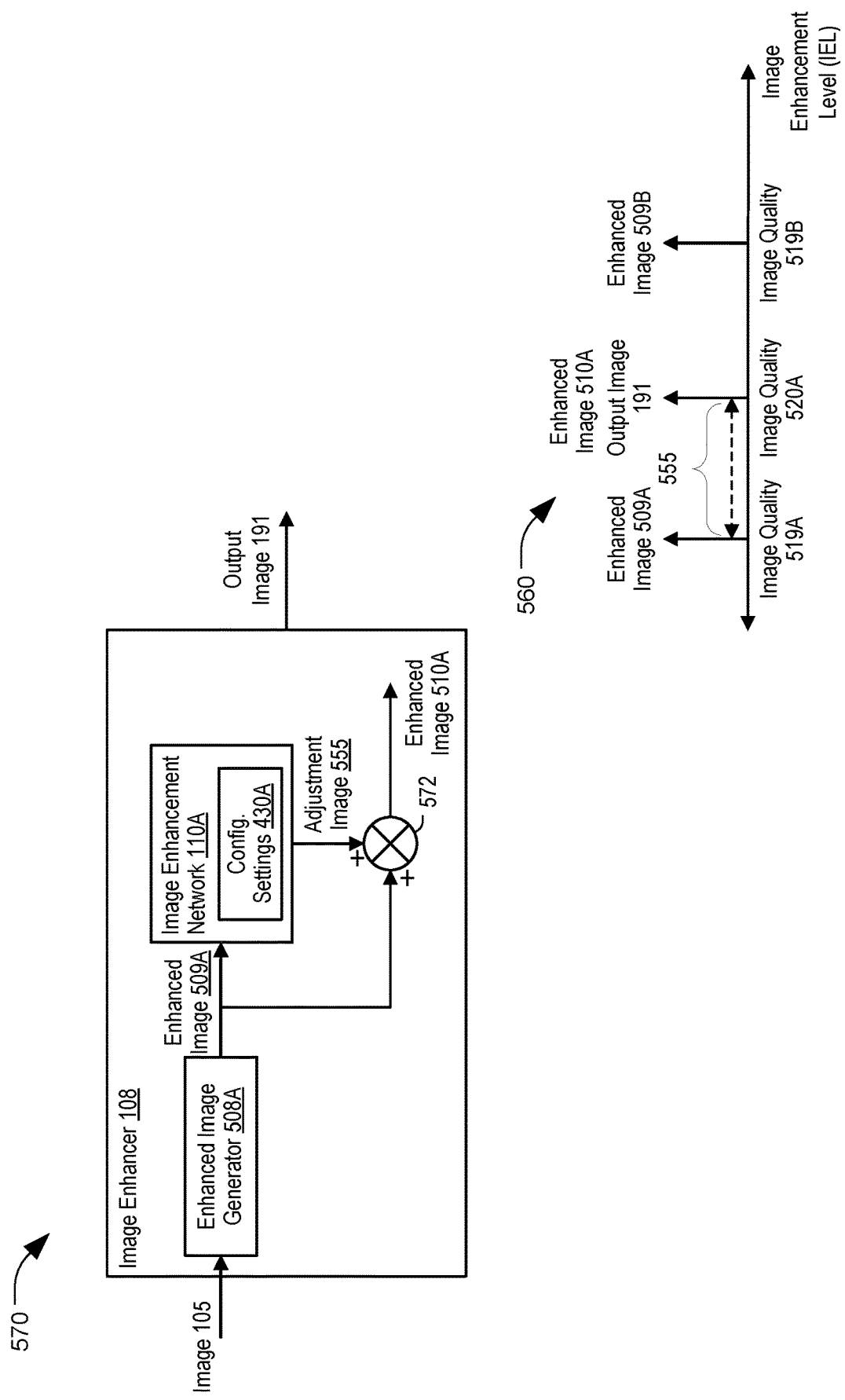
FIG. 5C is a diagram of another illustrative aspect of the image enhancer of the system of FIG. 1, in accordance with some examples of the present disclosure.

FIGS. 5A, 5B, and 5C depict various implementations of the image enhancer 108. In FIG. 5A, a diagram 500 illustrates that the image enhancer 108 uses the image enhancement network 110A to process the image 105 to generate an enhanced image 510A.

In a particular aspect, the image enhancement network 110A includes an input layer, one or more hidden layers, and an output layer. The image enhancer 108 may pre-process the image 105 to determine one or more feature values of the image 105 and may provide the one or more feature values to the input layer of the image enhancement network 110A.

The one or more hidden layers process the one or more feature values based on the configuration settings 430A (e.g., weights and biases, enhancement strength, etc.) to generate one or more output features values that are output by the output layer. The image enhancer 108 generates the enhanced image 510A based on the one or more output feature values. The image enhancer 108 outputs the enhanced image 510A as the output image 191.

In FIG. 5B, a diagram 550 illustrates that the image enhancer 108 includes an enhanced image generator 508A and an enhanced image generator 508B. Each of the enhanced image generator 508A and the enhanced image generator 508B is coupled via a combiner 552 to the image enhancement network 110A. The enhanced image generator 508A and the image enhancement network 110A are coupled to a combiner 556 that outputs the enhanced image 510A.

The enhanced image generator 508A includes an upsampler 530A. The upsampler 530A applies upsampling (e.g., bilinear upsampling) to the image 105 to generate an enhanced image 509A. The enhanced image generator 508B includes an upsampler 530B coupled to a neural network 532. The upsampler 530B applies upsampling (e.g., bilinear upsampling) to the image 105 to generate an upsampled image 531. In a particular aspect, the upsampled image 531 is the same as (e.g., a copy of) the enhanced image 509A. The enhanced image generator 508B uses the neural network 532 to process (e.g., apply super-resolution to) the upsampled image 531 to generate an enhanced image 509B.

The combiner 552 generates a difference image 553 based on a difference between the enhanced image 509B and the enhanced image 509A. The image enhancement network 110A processes the difference image 553 to generate an adjustment image 555. In an example, the image enhancement network 110A modifies the difference image 553 to generate the adjustment image 555 based on the configuration settings 430A. In a particular aspect, the image enhancement network 110A corresponds to a difference image enhancer that processes the difference image 553 to generate the adjustment image 555. The difference image enhancer implemented as a network is provided as an illustrative example. In some examples, the difference image enhancer can be implemented as another type of component or algorithm that is independent of a neural network. The combiner 556 combines the enhanced image 509A and the adjustment image 555 to generate an enhanced image 510A. The enhanced image 510A corresponds to an image enhancement level 520A that is between an image enhancement level 519A of the enhanced image 509A and an image enhancement level 519B of the enhanced image 509B, illustrated in a diagram 560.

For example, if the adjustment image 555 is blank, the enhanced image 510A is the same as the enhanced image 509A. The more similar the adjustment image 555 is to the difference image 553, the more similar the enhanced image 510A is to the enhanced image 509B. The configuration command generator 206 of FIG. 2 configures the image enhancer 108 to adjust the similarity of the adjustment image 555 to the difference image 553. Adjusting the similarity of the adjustment image 555 adjusts the enhancement level of the enhanced image 510A relative to the enhancement level of the enhanced image 509B. In a particular aspect, the image 105 includes compression artifacts. If the adjusted image compression quality metric 214 of FIG. 2 indicates a higher level of compression artifacts (e.g., satisfying a first image compression quality range), the image enhancer 108 is configured to generate the enhanced image 510A corresponding to a lower enhancement level. If the adjusted image compression quality metric 214 indicates a lower level of compression of artifacts (e.g., satisfying a second image compression quality range), the image enhancer 108 is configured to generate the enhanced image 510A corresponding to a higher enhancement level. The image enhancer 108 outputs the enhanced image 510A as the output image 191.

In FIG. 5C, a diagram 570 illustrates that the image enhancer 108 includes the enhanced image generator 508A coupled to the image enhancement network 110A and a combiner 572.

The enhanced image generator 508A performs enhancement (e.g., upsampling) on the image 105 to generate the enhanced image 509A. The image enhancement network 110A processes the enhanced image 509A to generate the adjustment image 555 based on the configuration settings 430A. The combiner 572 generates the enhanced image 510A by combining the adjustment image 555 and the enhanced image 509A. The configuration command generator 206 of FIG. 2 configures the image enhancer 108 to adjust the adjustment image 555 in a similar manner as described for adjusting the similarity of the adjustment image 555 to the difference image 553 of FIG. 5B to control the enhancement level of the enhanced image 510A. The image enhancer 108 generates the adjustment image 555 independently of generating the difference image 553. For example, the image enhancement network 110A generates the adjustment image 555 by processing the image 105 without generating the enhanced image 509B or the difference image 553. In a particular aspect, the implementation of the image enhancer 108 shown in the diagram 570 achieves the same result using fewer resources (e.g., fewer computations, less power, and less time) as the implementation of the image enhancer 108 shown in the diagram 550.

Figure 6:
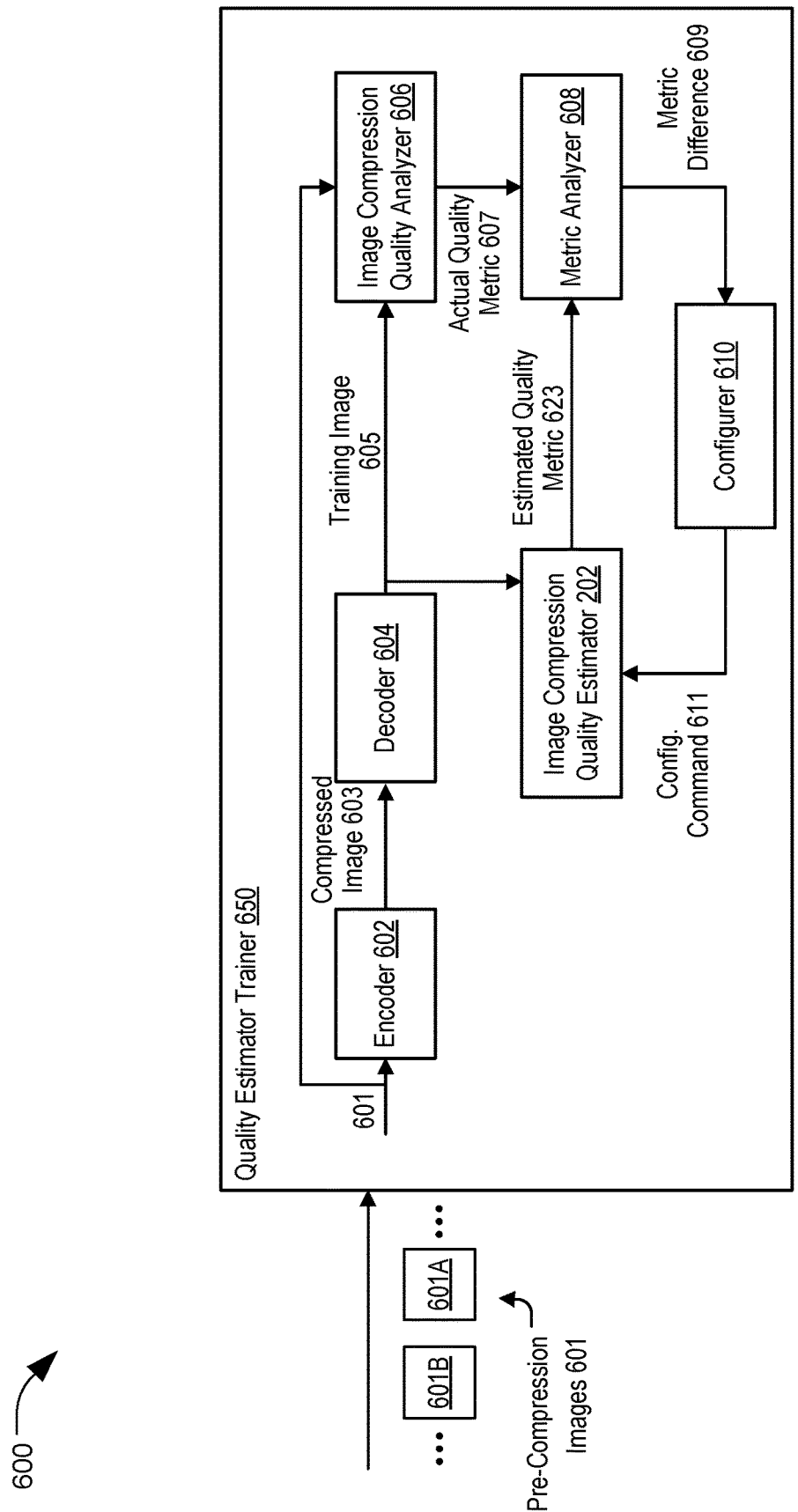
FIG. 6 is a diagram of an illustrative aspect of a trainer of an image compression quality estimator of the system of FIG. 1, in accordance with some examples of the present disclosure.

Referring to FIG. 6, a diagram 600 of an illustrative aspect of a quality estimator trainer 650 is shown. The quality estimator trainer 650 is configured to train the image compression quality estimator 202 (e.g., a neural network). In a particular aspect, the system 100 of FIG. 1 includes the quality estimator trainer 650. In a particular example, the device 102 includes the quality estimator trainer 650. In another example, the device 112 includes the quality estimator trainer 650 and provides the image compression quality estimator 202 to the device 102.

The quality estimator trainer 650 includes an encoder 602 (e.g., an image compressor) coupled via a decoder 604 (e.g., an image de-compressor) and an image compression quality analyzer 606 to a metric analyzer 608. The encoder 602 is also coupled via the image compression quality estimator 202 to the metric analyzer 608. The metric analyzer 608 is coupled via a configurer 610 to the image compression quality estimator 202. The encoder 602 and the decoder 604 are provided as illustrative examples of an image compressor and an image de-compressor, respectively. In some examples, the quality estimator 650 can include other types of image compressor and image de-compressor.

The quality estimator trainer 650 is configured to use one or more pre-compression images 601 to train the image compression quality estimator 202. In a particular example, the one or more pre-compression images 601 include a pre-compression image 601A, a pre-compression image 601B, one or more additional pre-compression images, or a combination thereof.

The encoder 602 performs image compression (e.g., encoding) on a pre-compression image 601 to generate a compressed image 603. In a particular aspect, an image pre-processor (not shown in FIG. 6) performs additional processing on the pre-compression image 601 to generate a pre-processed image and the encoder 602 performs the image compression on the pre-processed image to generate the compressed image 603. In a particular aspect, the additional processing (e.g., pre-processing) includes transcoding, selecting a high-frequency portion, cropping to remove portions other than the high-frequency portion, performing a color space conversion to a first color space (e.g., RGB), or a combination thereof. In a particular aspect, the pre-processor performs one or more operations performed by the portion selector 224, the image compression quality estimator 202 of FIG. 2, or both, prior to determining the image compression quality metric 212. The encoder 602 provides the compressed image 603 to the decoder 604.

The decoder 604 performs image decompression (e.g., decoding) on the compressed image 603 to generate a training image 605 (e.g., a decompressed image). The decoder 604 provides the training image 605 to each of the image compression quality analyzer 606 and the image compression quality estimator 202. In a particular aspect, the decoder 604 performs image decompression (e.g., decoding) on the compressed image 603 to generate a decompressed image and provides the decompressed image to an image post-processor (not shown in FIG. 6). The image post-processor performs additional processing on the decompressed image to generate the training image 605 and provides the training image 605 to each of the image compression quality analyzer 606 and the image compression quality estimator 202. In a particular aspect, the additional processing (e.g., post-processing) includes transcoding, selecting a high-frequency portion, cropping to remove portions other than the high-frequency portion, performing a color space conversion to a first color space (e.g., RGB), or a combination thereof. In a particular aspect, the post-processor performs one or more operations performed by the portion selector 224, the image compression quality estimator 202 of FIG. 2, or both, prior to determining the image compression quality metric 212.

The image compression quality analyzer 606 generates an actual quality metric 607 based on a comparison of the pre-compression image 601 and the training image 605. Fewer differences between the pre-compression image 601 and the training image 605 indicate fewer compression artifacts in the training image 605. The image compression quality analyzer 606 provides the actual quality metric 607 to the metric analyzer 608.

The image compression quality estimator 202 processes the training image 605 to generate an estimated quality metric 623. For example, the estimated quality metric 623 is a prediction of the actual quality metric 607. The image compression quality estimator 202 provides the estimated quality metric 623 to the metric analyzer 608.

The metric analyzer 608 determines a metric difference 609 based on a comparison of the actual quality metric 607 and the estimated quality metric 623. The metric analyzer 608 provides the metric difference 609 to the configurer 610. The configurer 610 uses various neural network training techniques to train the image compression quality estimator 202 based on the metric difference 609 (e.g., a training loss). For example, the configurer 610 generates a configuration command 611 based on the metric difference 609 to adjust configuration settings (e.g., weights and biases) of the image compression quality estimator 202 (e.g., a convolutional neural network (CNN)). The configuration settings are adjusted based on the metric difference 609 (e.g., a training loss). In a particular aspect, the quality estimator trainer 650 determines that training of the image compression quality estimator 202 is complete in response to determining that the metric difference 609 satisfies a tolerance threshold. The quality estimator trainer 650, in response to determining that the training of the image compression quality estimator 202 is complete, provides the image compression quality estimator 202 to the image enhancement configurer 140 of FIG. 1.

Figure 7:
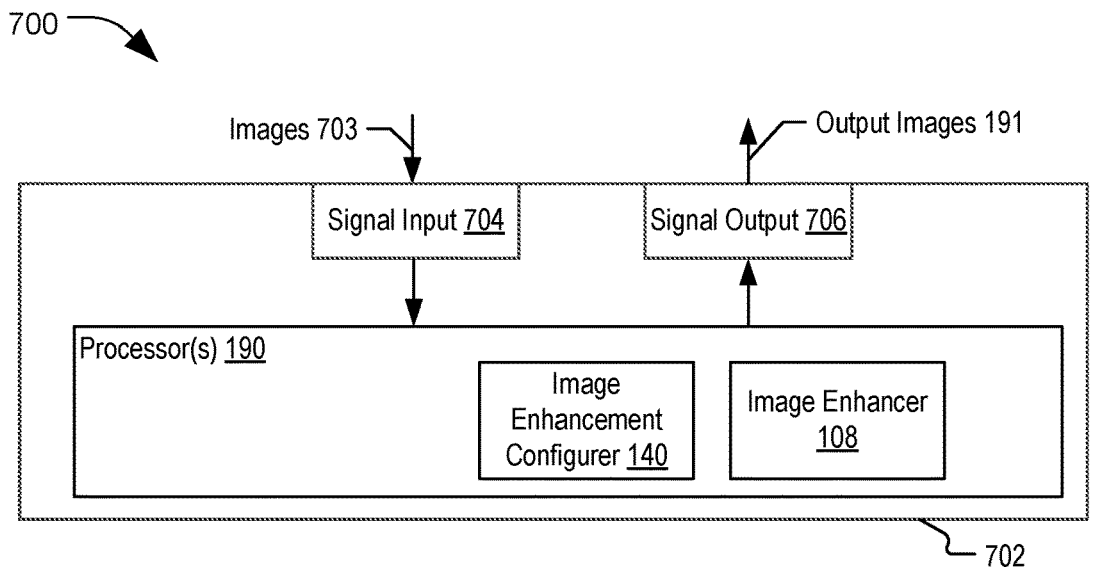
FIG. 7 illustrates an example of an integrated circuit operable to perform configurable image enhancement, in accordance with some examples of the present disclosure.
Figure 11:
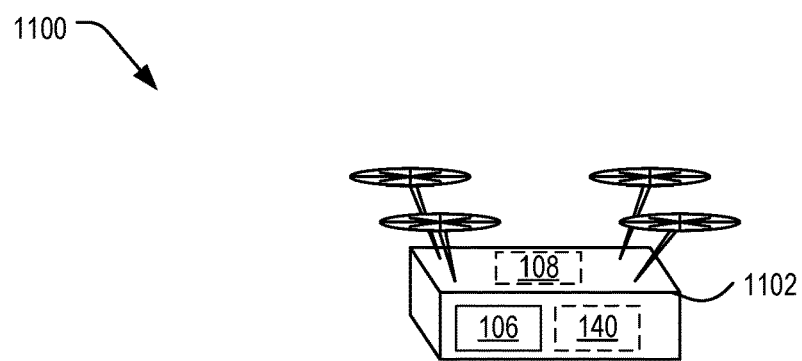
FIG. 11 is a diagram of a first example of a vehicle operable to perform configurable image enhancement, in accordance with some examples of the present disclosure.
Figure 12:
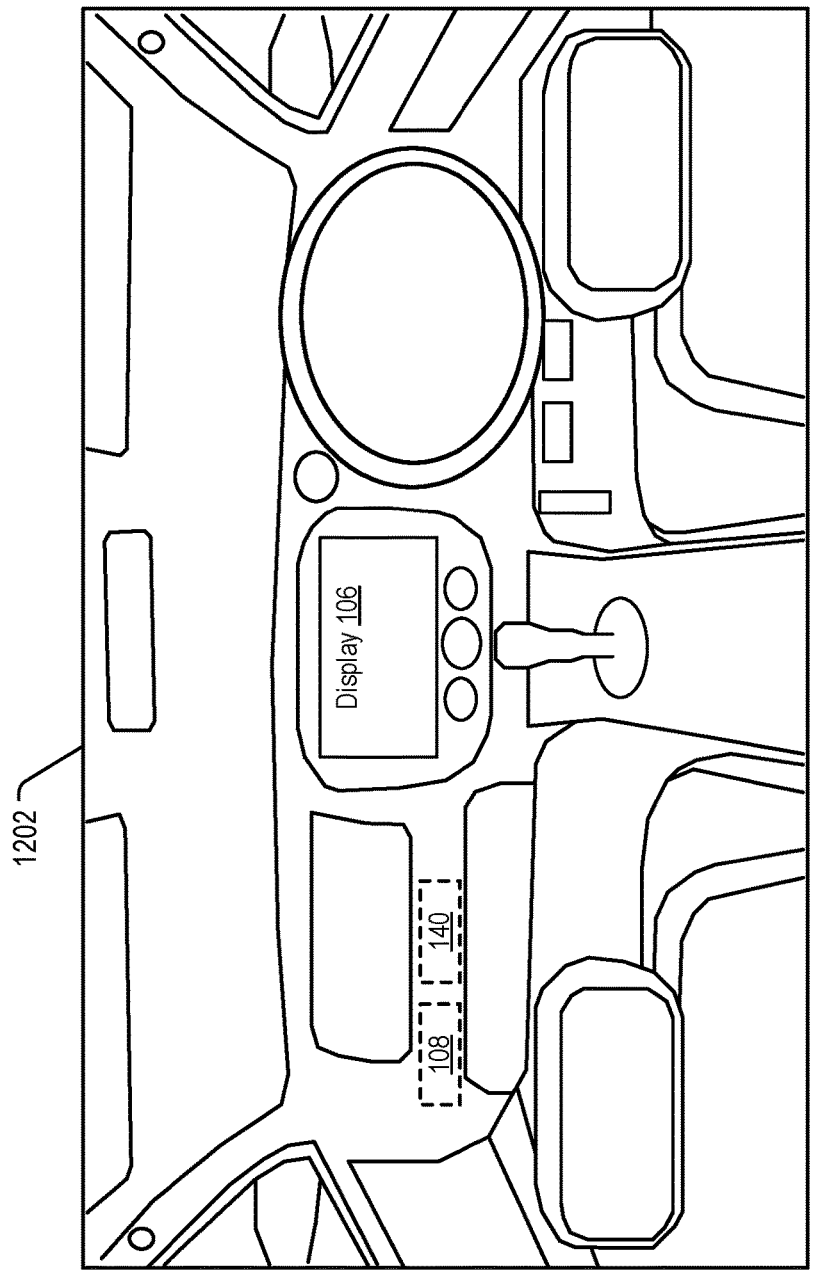
FIG. 12 is a diagram of a second example of a vehicle operable to perform configurable image enhancement, in accordance with some examples of the present disclosure.

FIG. 7 depicts an implementation 700 of the device 102 as an integrated circuit 702 that includes the one or more processors 190. The integrated circuit 702 also includes a signal input 704, such as one or more bus interfaces, to enable images 703 to be received for processing. In a particular aspect, the images 703 include the images 103 or the images 105. The integrated circuit 702 also includes a signal output 706, such as a bus interface, to enable sending of an output signal, such as the output images 191. The integrated circuit 702 enables implementation of configurable image enhancement as a component in a system, such as a mobile phone or tablet as depicted in FIG. 8, a wearable electronic device as depicted in FIG. 9, a virtual reality, mixed reality, or augmented reality headset as depicted in FIG. 10, or a vehicle as depicted in FIG. 11 or FIG. 12.

Figure 8:
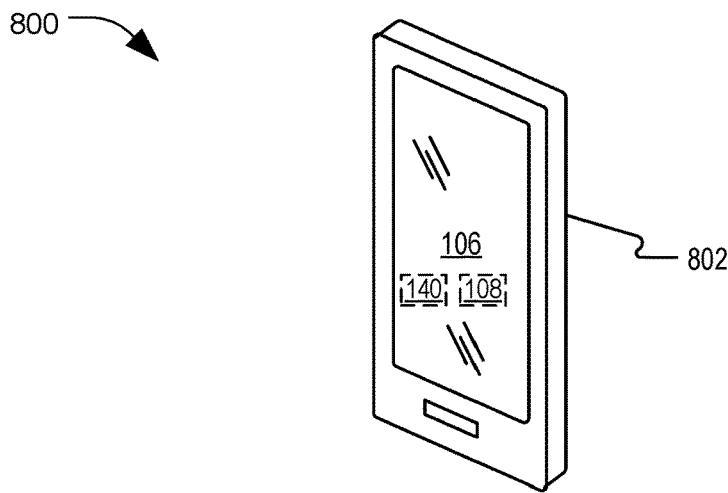
FIG. 8 is a diagram of a mobile device operable to perform configurable image enhancement, in accordance with some examples of the present disclosure.

FIG. 8 depicts an implementation 800 in which the device 102 includes a mobile device 802, such as a phone or tablet, as illustrative, non-limiting examples. The mobile device 802 includes the display device 106. Components of the one or more processors 190, including the image enhancer 108, the image enhancement configurer 140, or both, are integrated in the mobile device 802 and are illustrated using dashed lines to indicate internal components that are not generally visible to a user of the mobile device 802. In a particular example, the image enhancement configurer 140 and the image enhancer 108 operate to generate the one or more output images 191, which is then processed to perform one or more operations at the mobile device 802, such as to launch a graphical user interface or otherwise display the one or more output images 191 at the display device 106 (e.g., display screen).

Figure 9:
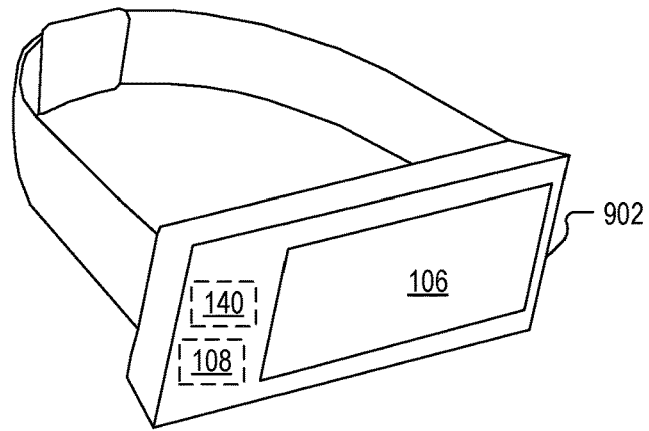
FIG. 9 is a diagram of a wearable electronic device operable to perform configurable image enhancement, in accordance with some examples of the present disclosure.

FIG. 9 depicts an implementation 900 in which the device 102 includes a wearable electronic device 902, illustrated as a "smart watch." The image enhancer 108 and the image enhancement configurer 140 are integrated into the wearable electronic device 902. In a particular example, the image enhancement configurer 140 and the image enhancer 108 operate to generate the one or more output images 191, which are then processed to perform one or more operations at the wearable electronic device 902, such as to launch a graphical user interface or otherwise display the one or more output images 191 at the display device 106 (e.g., display screen) of the wearable electronic device 902. In a particular example, the wearable electronic device 902 includes a haptic device that provides a haptic notification (e.g., vibrates) in response to detection that the one or more output images 191 are ready for display. For example, the haptic notification can cause a user to look at the wearable electronic device 902 to see the one or more output images 191. The wearable electronic device 902 can thus alert a user with a hearing impairment or a user wearing a headset that the video data is detected.

Figure 10:
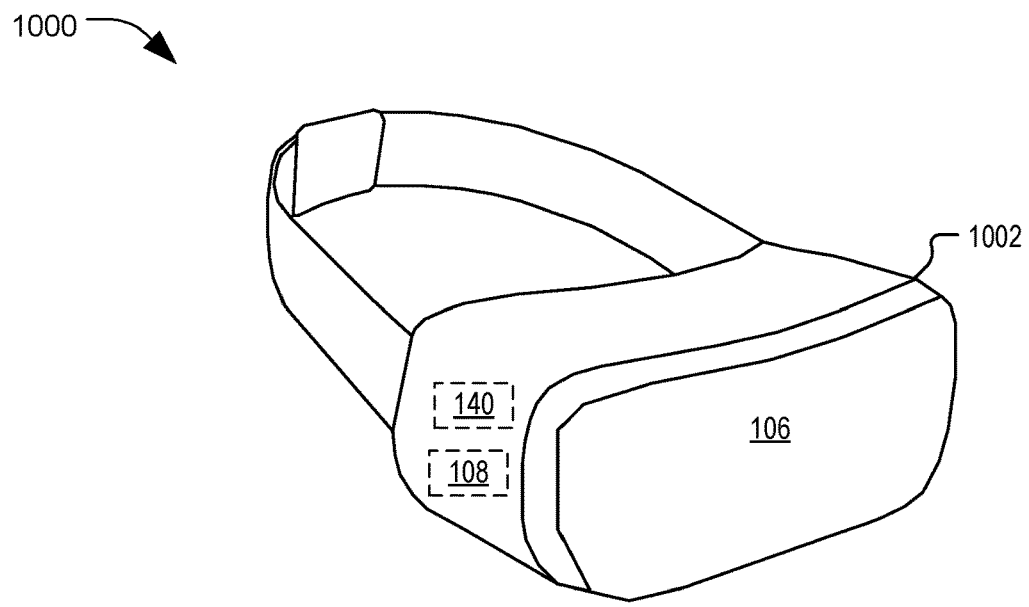
FIG. 10 is a diagram of a headset, such as a virtual reality, mixed reality, or augmented reality headset, operable to perform configurable image enhancement, in accordance with some examples of the present disclosure.

FIG. 10 depicts an implementation 1000 in which the device 102 includes a portable electronic device that corresponds to a virtual reality, augmented reality, or mixed reality headset 1002. The image enhancer 108 and the image enhancement configurer 140 are integrated into the headset 1002. A visual interface device (e.g., the display device 106) is positioned in front of the user's eyes to enable display of augmented reality, mixed reality, or virtual reality images or scenes to the user while the headset 1002 is worn. In a particular example, the visual interface device is configured to display the one or more output images 191.

FIG. 11 depicts an implementation 1100 in which the device 102 corresponds to, or is integrated within, a vehicle 1102, illustrated as a manned or unmanned aerial device (e.g., a package delivery drone). The image enhancer 108, the image enhancement configurer 140, the display device 106 (e.g., a display screen), or a combination thereof, are integrated into the vehicle 1102. The one or more output images 191 can be displayed at the display device 106, such as for delivery communication, an advertisement, installation instructions, or a combination thereof, for a recipient.

FIG. 12 depicts another implementation 1200 in which the device 102 corresponds to, or is integrated within, a vehicle 1202, illustrated as a car. The vehicle 1202 includes the one or more processors 190 including the image enhancer 108, the image enhancement configurer 140, or both. In a particular implementation, in response to generating the one or more output images 191 via operation of the image enhancement configurer 140 and the image enhancer 108, the one or more output images 191 are displayed via the display device 106 (e.g., a display screen).

Figure 13:
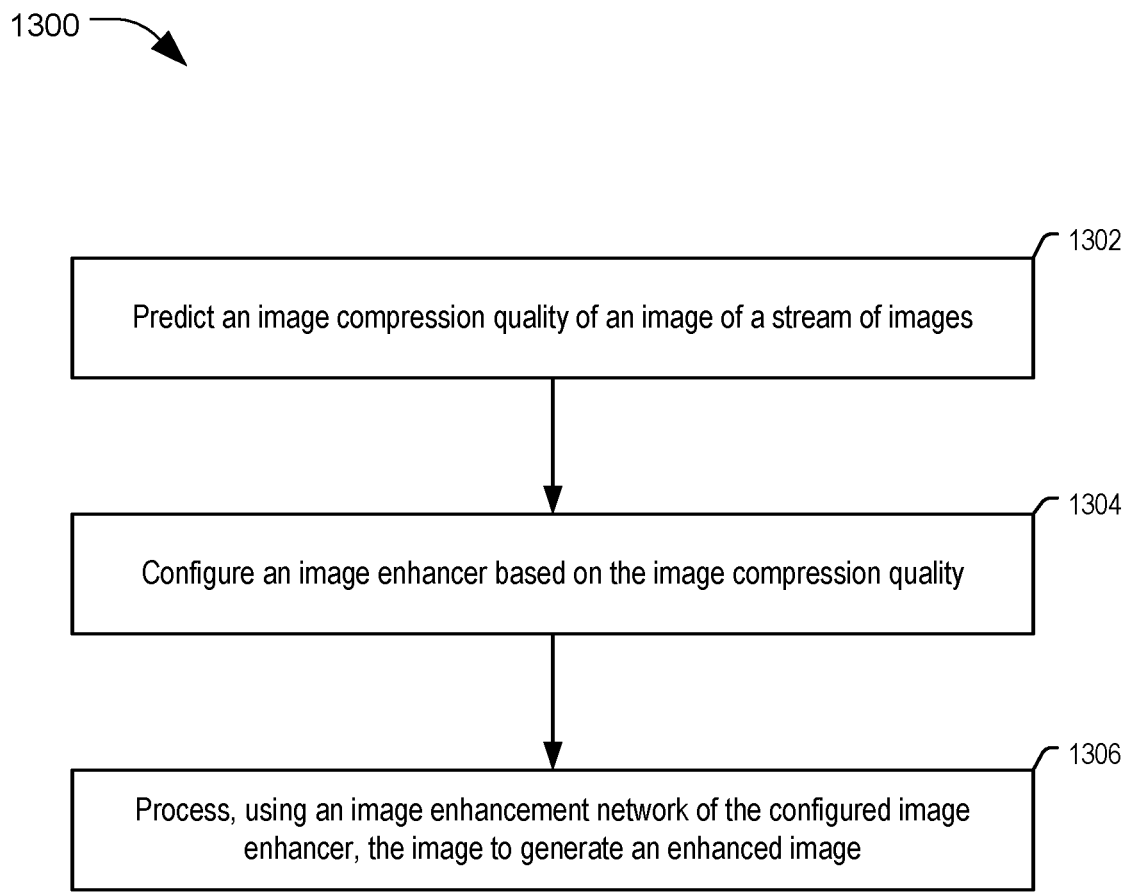
FIG. 13 is diagram of a particular implementation of a method of perform configurable image enhancement that may be performed by the device of FIG. 1, in accordance with some examples of the present disclosure.

Referring to FIG. 13, a particular implementation of a method 1300 of performing configurable image enhancement is shown. In a particular aspect, one or more operations of the method 1300 are performed by at least one of the image enhancement configurer 140, the image enhancer 108, the one or more image enhancement networks 110, the one or more processors 190, the device 102, the system 100 of FIG. 1, the high frequency analyzer 222, the portion selector 224, the image compression quality estimator 202, the image compression quality estimation adjuster 204, the configuration command generator 206, the change detector 230 of FIG. 2, the enhanced image generator 508A, the enhanced image generator 508B, the combiner 552, the combiner 556 of FIG. 5B, the combiner 572 of FIG. 5C, the encoder 602, the decoder 604, the image compression quality analyzer 606, the metric analyzer 608, the configurer 610, the quality estimator trainer 650 of FIG. 6, or a combination thereof.

The method 1300 includes predicting an image compression quality of an image of a stream of images, at 1302. For example, the image compression quality estimator 202 of FIG. 2 generates an image compression quality metric 212 based on an image 105 of the one or more images 105, as described with reference to FIG. 2. The image compression quality metric 212 indicates the image compression quality 139 (e.g., a predicted image compression quality) of the image 105, as described with reference to FIGS. 1-2.

The method 1300 also includes configuring an image enhancer based on the image compression quality, at 1304. For example, the configuration command generator 206 of FIG. 2 configures the image enhancer 108 based on the adjusted image compression quality metric 214, as described with reference to FIGS. 2 and 4. The adjusted image compression quality metric 214 is based on the image compression quality metric 212 (e.g., indicating the predicted image compression quality).

The method 1300 further includes processing, using an image enhancement network of the configured image enhancer, the image to generate an enhanced image, at 1306. For example, the image enhancer 108 of FIG. 1 processes, using the image enhancement network 110A of the image enhancer 108 (e.g., the configured image enhancer), the image 105 to generate the output image 191, such as the enhanced image 510A described with reference to FIGS. 5A-C.

The method 1300 thus enables the image enhancer 108 to be configured based on a predicted image compression quality. The image enhancer 108 can be configured to generate enhanced images corresponding to a particular enhancement level that corresponds to the predicted image compression quality. For example, in cases where the compression quality is lower, lower enhancement can be applied to reduce the impact of compression artifacts in the enhanced image. Alternatively, in cases where the compression quality is higher, higher enhancement can be applied to improve the image quality of the enhanced image.

The method 1300 of FIG. 13 may be implemented by a field-programmable gate array (FPGA) device, an application-specific integrated circuit (ASIC), a processing unit such as a central processing unit (CPU), a digital signal processor (DSP), a graphics processing unit (GPU), a controller, another hardware device, firmware device, or any combination thereof. As an example, the method 1300 of FIG. 13 may be performed by a processor that executes instructions, such as described with reference to FIG. 1 and FIG. 14.

Figure 14:
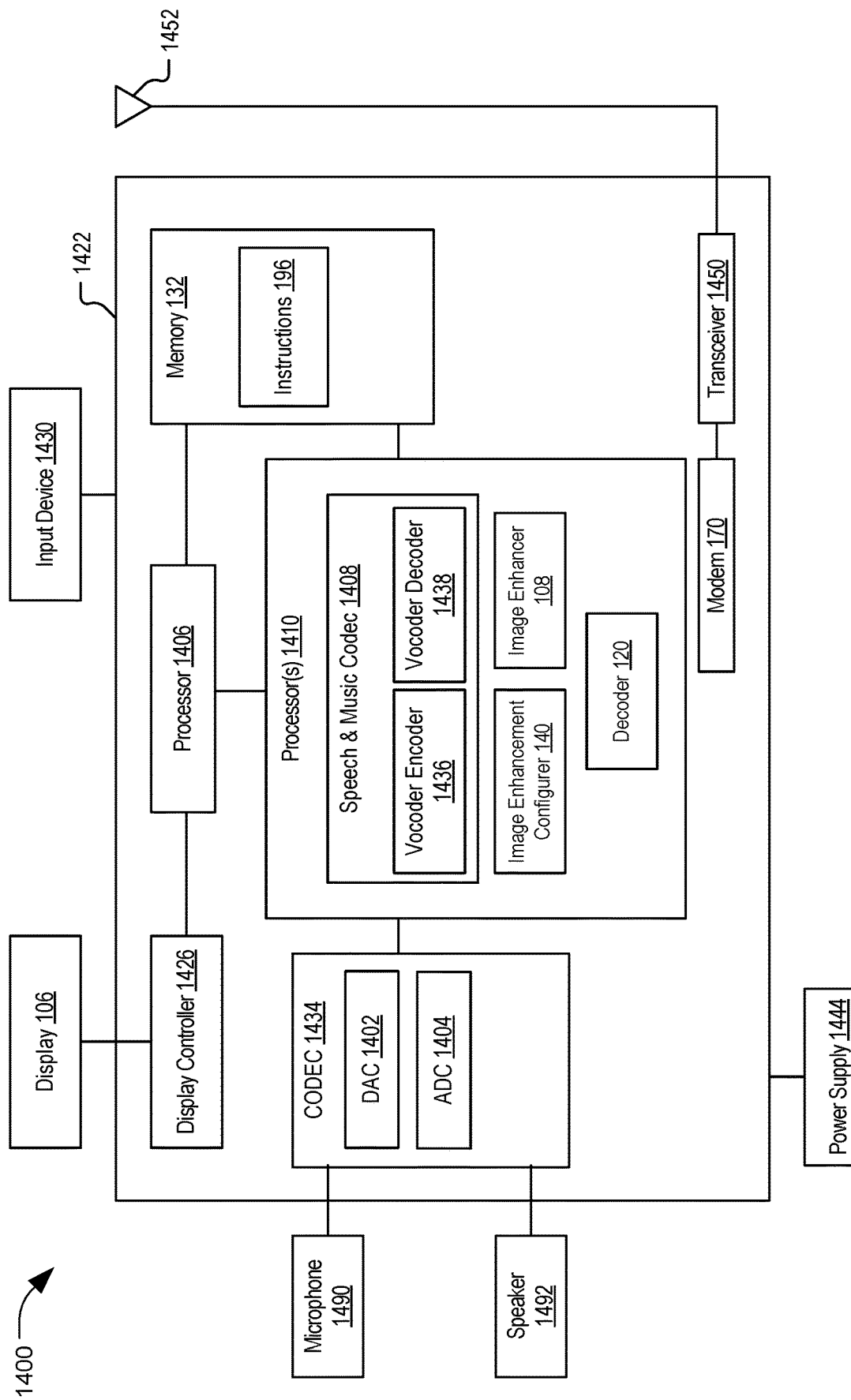
FIG. 14 is a block diagram of a particular illustrative example of a device that is operable to perform configurable image enhancement, in accordance with some examples of the present disclosure.

Referring to FIG. 14, a block diagram of a particular illustrative implementation of a device is depicted and generally designated 1400. In various implementations, the device 1400 may have more or fewer components than illustrated in FIG. 14. In an illustrative implementation, the device 1400 may correspond to the device 102. In an illustrative implementation, the device 1400 may perform one or more operations described with reference to FIGS. 1-13.

In a particular implementation, the device 1400 includes a processor 1406 (e.g., a central processing unit (CPU)). The device 1400 may include one or more additional processors 1410 (e.g., one or more DSPs, one or more GPUs, or a combination thereof). In a particular aspect, the one or more processors 190 of FIG. 1 correspond to the processor 1406, the processors 1410, or a combination thereof. The processors 1410 may include a speech and music coder-decoder (CODEC) 1408 that includes a voice coder ("vocoder") encoder 1436, a vocoder decoder 1438, or both. In a particular aspect, the processors 1410 may include the decoder 120, the image enhancer 108, the image enhancement configurer 140, or a combination thereof. In other implementations, the decoder 120, the image enhancer 108, the image enhancement configurer 140, or a combination thereof, may be included in the processor 1406.

The device 1400 may include the memory 132 and a CODEC 1434. The memory 132 may include the instructions 196 that are executable by the one or more additional processors 1410 (or the processor 1406) to implement the functionality described with reference to the image enhancement configurer 140, the image enhancer 108, or both. The device 1400 may include the modem 170 coupled, via a transceiver 1450, to an antenna 1452. In a particular aspect, the memory 132 is configured to store data used or generated during performance of one or more operations described herein.

The device 1400 may include the display device 106 coupled to a display controller 1426. A speaker 1492, a microphone 1490, or both, may be coupled to the CODEC 1434. The CODEC 1434 may include a digital-to-analog converter (DAC) 1402, an analog-to-digital converter (ADC) 1404, or both. In a particular implementation, the CODEC 1434 may receive analog signals from the microphone 1490, convert the analog signals to digital signals using the analog-to-digital converter 1404, and provide the digital signals to the speech and music codec 1408. The speech and music codec 1408 may process the digital signals, and the digital signals may further be processed by the processors 1410. In a particular implementation, the speech and music codec 1408 may provide digital signals to the CODEC 1434. The CODEC 1434 may convert the digital signals to analog signals using the digital-to-analog converter 1402 and may provide the analog signals to the speaker 1492.

In a particular implementation, the device 1400 may be included in a system-in-package or system-on-chip device 1422. In a particular implementation, the memory 132, the processor 1406, the processors 1410, the display controller 1426, the CODEC 1434, and the modem 170 are included in a system-in-package or system-on-chip device 1422. In a particular implementation, an input device 1430 and a power supply 1444 are coupled to the system-on-chip device 1422. Moreover, in a particular implementation, as illustrated in FIG. 14, the display device 106, the input device 1430, the speaker 1492, the microphone 1490, the antenna 1452, and the power supply 1444 are external to the system-on-chip device 1422. In a particular implementation, each of the display device 106, the input device 1430, the speaker 1492, the microphone 1490, the antenna 1452, and the power supply 1444 may be coupled to a component of the system-on-chip device 1422, such as an interface or a controller.

The device 1400 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described implementations, an apparatus includes means for predicting an image compression quality of an image of a stream of images. For example, the means for predicting can correspond to the image enhancement configurer 140, the one or more processors 190, the device 102, the system 100 of FIG. 1, the image compression quality estimator 202 of FIG. 2, the processor 1406, the processors 1410, one or more other circuits or components configured to predict an image compression quality, or any combination thereof.

The apparatus also includes means for configuring an image enhancer based on the image compression quality. For example, the means for configuring an image enhancer can correspond to the image enhancement configurer 140, the one or more processors 190, the device 102, the system 100 of FIG. 1, the change detector 230, the high frequency analyzer 222, the portion selector 224, the image compression quality estimator 202, the image compression quality estimation adjuster 204, the configuration command generator 206 of FIG. 2, the processor 1406, the processors 1410, one or more other circuits or components configured to configure an image enhancer, or any combination thereof.

The apparatus further includes processing, using an image enhancement network of the configured image enhancer, the image to generate an enhanced image. For example, the means for processing the image using an image enhancement network of a configured image enhancer can correspond to the image enhancer 108, the one or more processors 190, the device 102, the system 100 of FIG. 1, the processor 1406, the processors 1410, one or more other circuits or components configured to use an image enhancement network of a configured image enhancer, or any combination thereof.

In some implementations, a non-transitory computer-readable medium (e.g., a computer-readable storage device, such as the memory 132) includes instructions (e.g., the instructions 196) that, when executed by one or more processors (e.g., the one or more processors 190, the one or more processors 1410, or the processor 1406), cause the one or more processors to predict an image compression quality (e.g., the image compression quality 139) of an image (e.g., the image 105A) of a stream of images (e.g., the one or more images 105). The instructions, when executed by the one or more processors also cause the one or more processors to configure an image enhancer (e.g., the image enhancer 108) based on the image compression quality. The instructions, when executed by the one or more processors further cause the one or more processors to process, using an image enhancement network (e.g., the image enhancement network 110A) of the configured image enhancer, the image to generate an enhanced image (e.g., the output image 191A).

Particular aspects of the disclosure are described below in sets of interrelated clauses:

According to Clause 1, a device includes: a memory configured to store an image enhancement network of an image enhancer; and one or more processors configured to: predict an image compression quality of an image of a stream of images; configure the image enhancer based on the image compression quality; and process, using the image enhancement network of the configured image enhancer, the image to generate an enhanced image.

Clause 2 includes the device of Clause 1, wherein the image includes compression artifacts.

Clause 3 includes the device of Clause 1 or Clause 2, wherein the image compression quality corresponds to a difference between the image and a pre-compression image that has been compressed to generate a compressed image, and wherein the image is generated by decompressing the compressed image.

Clause 4 includes the device of any of Clause 1 to Clause 3, wherein predicting the image compression quality includes generating an image compression quality metric.

Clause 5 includes the device of any of Clause 1 to Clause 4, wherein the one or more processors are configured to predict the image compression quality based on a predicted peak-signal-to-noise ratio (PSNR).

Clause 6 includes the device of any of Clause 1 to Clause 5, wherein the one or more processors are configured to predict the image compression quality based on a predicted structural similarity index measure (SSIM).

Clause 7 includes the device of any of Clause 1 to Clause 6, wherein the one or more processors are configured to adjust the predicted image compression quality based on high frequency information of the image, wherein the image enhancer is configured based on the adjusted predicted image compression quality.

Clause 8 includes the device of any of Clause 1 to Clause 7, wherein the one or more processors are further configured to process, using a neural network, the image to predict the image compression quality.

Clause 9 includes the device of Clause 8, wherein the neural network is used to process a particular portion of the image to predict the image compression quality, the particular portion selected based on a high frequency portion of the image.

Clause 10 includes the device of any of Clause 1 to Clause 9, wherein configuring the image enhancer includes selecting the image enhancement network from a plurality of image enhancement networks, selecting particular configuration settings of the image enhancement network, or a combination thereof, to process the image.

Clause 11 includes the device of any of Clause 1 to Clause 10, wherein configuring the image enhancer includes selecting the image enhancement network from a plurality of image enhancement networks to process the image.

Clause 12 includes the device of any of Clause 1 to Clause 10, wherein configuring the image enhancer includes selecting particular configuration settings of the image enhancement network to process the image.

Clause 13 includes the device of any of Clause 1 to Clause 10, wherein configuring the image enhancer includes selecting the image enhancement network from a plurality of image enhancement networks and selecting particular configuration settings of the image enhancement network to process the image.

Clause 14 includes the device of any of Clause 10 to Clause 13, wherein the plurality of image enhancement networks is stored in the memory, retrieved from another device, or both.

Clause 15 includes the device of any of Clause 10 to Clause 14, wherein the plurality of image enhancement networks is stored in the memory.

Clause 16 includes the device of any of Clause 10 to Clause 14, wherein the plurality of image enhancement networks is retrieved from another device.

Clause 17 includes the device of any of Clause 10 to Clause 16, wherein the plurality of image enhancement networks is associated with image content types, and wherein the one or more processors are configured to select the image enhancement network from the plurality of image enhancement networks based at least in part on an image content type of the image.

Clause 18 includes the device of any of Clause 1 to Clause 17, wherein configuring the image enhancer includes, based on the predicted image compression quality indicating a greater than an image compression quality threshold, selecting a neural network that is trained based on a Generative Adversarial Network (GAN) technique as the image enhancement network to process the image.

Clause 19 includes the device of any of Clause 1 to Clause 18, wherein configuring the image enhancer includes, based on the predicted image compression quality indicating a less than or equal to an image compression quality threshold, selecting a neural network that is trained based on a pixel-wise loss as the image enhancement network to process the image.

Clause 20 includes the device of any of Clause 1 to Clause 19, wherein processing the input image using the configured image enhancer includes: generating a first enhanced image based on the image; generating an adjustment image based on a difference between the first enhanced image and a second enhanced image; and generating the enhanced image by combining the adjustment image and the first enhanced image.

Clause 21 includes the device of Clause 20, wherein processing the input image using the configured image enhancer also includes: generating a difference image based on the difference between the first enhanced image and the second enhanced image; and modifying the difference image to generate the adjustment image.

Clause 22 includes the device of Clause 20 or Clause 21, wherein generating the first enhanced image includes applying bilinear upsampling to the image.

Clause 23 includes the device of any of Clause 20 to Clause 22, wherein generating the second enhanced image includes: applying bilinear upsampling to the image to generate an upsampled image; and using a neural network to apply super-resolution to the upsampled image.

Clause 24 includes the device of any of Clause 1 to Clause 23, wherein the one or more processors are configured to configure the image enhancer responsive to detecting a scene change in the stream of images.

Clause 25 includes the device of any of Clause 1 to Clause 24, further including a modem configured to receive a stream of input images, wherein the one or more processors are configured to generate the stream of images by decoding the stream of input images.

According to Clause 26, a non-transitory computer-readable medium stores instructions that, when executed by one or more processors, cause the one or more processors to: predict an image compression quality of an image of a stream of images; configure an image enhancer based on the image compression quality; and process, using an image enhancement network of the configured image enhancer, the image to generate an enhanced image.

Clause 27 includes the non-transitory computer-readable medium of Clause 26, wherein the instructions, when executed by the one or more processors, cause the one or more processors to predict the image compression quality based on a predicted peak-signal-to-noise ratio (PSNR).

Clause 28 includes the non-transitory computer-readable medium of Clause 26 or Clause 27, wherein the instructions, when executed by the one or more processors, cause the one or more processors to predict the image compression quality based on a predicted structural similarity index measure (SSIM).

Clause 29 includes the non-transitory computer-readable medium of any of Clause 26 to Clause 28, wherein the instructions, when executed by the one or more processors, cause the one or more processors to adjust the predicted image compression quality based on high frequency information of the image, wherein the image enhancer is configured based on the adjusted predicted image compression quality.

According to Clause 30, an apparatus includes: means for predicting an image compression quality of an image of a stream of images; means for configuring an image enhancer based on the image compression quality; and means for processing, using an image enhancement network of the configured image enhancer, the image to generate an enhanced image.

Clause 31 includes the apparatus of Clause 30, wherein the means for predicting, the means for configuring, and the means for processing are integrated into at least one of a communication device, a computer, a display device, a television, a gaming console, a digital video player, a camera, a navigation device, a vehicle, a headset, an augmented reality headset, a mixed reality headset, a virtual reality headset, an aerial vehicle, a home automation system, a voice-activated device, an internet-of-things (IoT) device, a virtual reality (VR) device, a base station, or a mobile device.

According to Clause 32, a method includes: predicting, at a device, an image compression quality of an image of a stream of images; configuring, at the device, an image enhancer based on the image compression quality; and processing, using an image enhancement network of the configured image enhancer, the image to generate an enhanced image.

Clause 33 includes the method of Clause 32, wherein the image includes compression artifacts.

Clause 34 includes the method of Clause 32 or Clause 33, wherein the image compression quality corresponds to a difference between the image and a pre-compression image that has been compressed to generate a compressed image, and wherein the image is generated by decompressing the compressed image.

Clause 35 includes the method of any of Clause 32 to Clause 35, wherein predicting the image compression quality includes generating an image compression quality metric.

Clause 36 includes the method of any of Clause 32 to Clause 35, further including predicting the image compression quality based on a predicted peak-signal-to-noise ratio (PSNR).

Clause 37 includes the method of any of Clause 32 to Clause 36, further including predicting the image compression quality based on a predicted structural similarity index measure (SSIM).

Clause 38 includes the method of any of Clause 32 to Clause 37, further including adjusting the predicted image compression quality based on high frequency information of the image, wherein the image enhancer is configured based on the adjusted predicted image compression quality.

Clause 39 includes the method of any of Clause 32 to Clause 38, further including processing, using a neural network, the image to predict the image compression quality.

Clause 40 includes the method of Clause 39, wherein the neural network is used to process a high frequency portion of the image to predict the image compression quality.

Clause 41 includes the method of any of Clause 32 to Clause 40, wherein configuring the image enhancer includes selecting the image enhancement network from a plurality of image enhancement networks, selecting particular configuration settings of the image enhancement network, or a combination thereof, to process the image.

Clause 42 includes the method of any of Clause 32 to Clause 41, wherein configuring the image enhancer includes selecting the image enhancement network from a plurality of image enhancement networks to process the image.

Clause 43 includes the method of any of Clause 32 to Clause 41, wherein configuring the image enhancer includes selecting particular configuration settings of the image enhancement network to process the image.

Clause 44 includes the method of any of Clause 32 to Clause 41, wherein configuring the image enhancer includes selecting the image enhancement network from a plurality of image enhancement networks and selecting particular configuration settings of the image enhancement network to process the image.

Clause 45 includes the method of any of Clause 41 to Clause 44, wherein the plurality of image enhancement networks is stored in the memory, retrieved from another device, or both.

Clause 46 includes the method of any of Clause 41 to Clause 45, wherein the plurality of image enhancement networks is stored in the memory.

Clause 47 includes the method of any of Clause 41 to Clause 45, wherein the plurality of image enhancement networks is retrieved from another device.

Clause 48 includes the method of any of Clause 41 to Clause 47, wherein the plurality of image enhancement networks is associated with image content types, and further including selecting the image enhancement network from the plurality of image enhancement networks based at least in part on an image content type of the image.

Clause 49 includes the method of any of Clause 32 to Clause 48, wherein configuring the image enhancer includes, based on the predicted image compression quality indicating a greater than an image compression quality threshold, selecting a neural network that is trained based on a Generative Adversarial Network (GAN) technique as the image enhancement network to process the image.

Clause 50 includes the method of any of Clause 32 to Clause 49, wherein configuring the image enhancer includes, based on the predicted image compression quality indicating a less than or equal to an image compression quality threshold, selecting a neural network that is trained based on a pixel-wise loss as the image enhancement network to process the image.

Clause 51 includes the method of any of Clause 32 to Clause 50, wherein processing the image using the configured image enhancer includes: generating a first enhanced image based on the image; generating an adjustment image based on a difference between the first enhanced image and a second enhanced image; and generating the enhanced image by combining the adjustment image and the first enhanced image.

Clause 52 includes the method of Clause 51, wherein processing the image using the configured image enhancer also includes: generating a difference image based on the difference between the first enhanced image and the second enhanced image; and modifying the difference image to generate the adjustment image.

Clause 53 includes the method of Clause 51 or Clause 52, wherein generating the first enhanced image includes applying bilinear upsampling to the image.

Clause 54 includes the method of any of Clause 51 to Clause 53, wherein generating the second enhanced image includes: applying bilinear upsampling to the image to generate an upsampled image; and using a neural network to apply super-resolution to the upsampled image.

Clause 55 includes the method of any of Clause 32 to Clause 54, further including configuring the image enhancer responsive to detecting a scene change in the stream of images.

Clause 56 includes the method of any of Clause 32 to Clause 55, further including: receiving a stream of input images via a modem; and generating the stream of images by decoding the stream of input images.

According to Clause 57, a device includes: a memory configured to store instructions; and one or more processors configured to execute the instructions to perform the method of any of Clause 32 to Clause 56.

According to Clause 58, a non-transitory computer-readable medium stores instructions that, when executed by one or more processors, cause the one or more processors to perform the method of any of Clause 32 to Clause 56.

According to Clause 59, an apparatus includes means for performing the method of any of Clause 32 to Clause 56.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
    a memory configured to store an image enhancement network of an image enhancer; and
    one or more processors configured to:
        predict an image compression quality of an image of a stream of images; and
        configure, based on the predicted image compression quality, the image enhancer to:
            generate a first enhanced image based on the image;
            generate a second enhanced image based on the image;
            determine a difference between the first enhanced image and the second enhanced image;
            generate an adjustment image, by the image enhancement network of the configured image enhancer, based on the difference between the first enhanced image and the second enhanced image; and
            combine the adjustment image and the first enhanced image to generate an output image.

2. The device of claim 1, wherein the image includes compression artifacts.

3. The device of claim 1, wherein the image compression quality corresponds to a difference between the image and a pre-compression image that has been compressed to generate a compressed image, and wherein the image is generated based on decompression of the compressed image.

4. The device of claim 1, wherein, to predict the image compression quality, the one or more processors are configured to generate an image compression quality metric.

5. The device of claim 1, wherein the one or more processors are configured to predict the image compression quality based on a predicted peak-signal-to-noise ratio (PSNR).

6. The device of claim 1, wherein the one or more processors are configured to predict the image compression quality based on a predicted structural similarity index measure (SSIM).

7. The device of claim 1, wherein the one or more processors are configured to adjust the predicted image compression quality based on high frequency information of the image, wherein the image enhancer is configured based on the adjusted predicted image compression quality.

8. The device of claim 1, wherein the one or more processors are further configured to process, using a neural network, the image to predict the image compression quality.

9. The device of claim 8, wherein the one or more processors are configured to:
    select a portion of the image based on a high frequency portion of the image, and
    use the neural network to process the portion of the image to predict the image compression quality.

10. The device of claim 1, wherein, to configure the image enhancer to process the difference between the first enhanced image and the second enhanced image, the one or more processors are configured to select the image enhancement network from a plurality of image enhancement networks, select particular configuration settings of the image enhancement network, or a combination thereof.

11. The device of claim 10, wherein the plurality of image enhancement networks is stored in the memory, the one or more processors is configured to retrieve the plurality of image enhancement networks from another device, or both.

12. The device of claim 10, wherein the plurality of image enhancement networks is associated with image content types, and wherein the one or more processors are configured to select the image enhancement network from the plurality of image enhancement networks based on an image content type of the image.

13. The device of claim 1, wherein, to configure the image enhancer, the one or more processors are configured to, based on the predicted image compression quality being greater than an image compression quality threshold, select a neural network trained based on a Generative Adversarial Network (GAN) technique as the image enhancement network to process the difference between the first enhanced image and the second enhanced image.

14. The device of claim 1, wherein, to configure the image enhancer, the one or more processors are configured to, based on the predicted image compression quality being less than or equal to an image compression quality threshold, select a neural network trained based on a pixel-wise loss as the image enhancement network to process the difference between the first enhanced image and the second enhanced image.

15. The device of claim 1, wherein the one or more processors are configured to:
modify the difference image to generate the adjustment image prior to input into the image enhancement network.

16. The device of claim 1, wherein, to generate the first enhanced image, the one or more processors are configured to apply upsampling to the image.

17. The device of claim 1, wherein, to generate the apply upsampling to the image to generate an upsampled image; and
apply, using a neural network, super-resolution to the upsampled image.

18. The device of claim 1, wherein the one or more processors are configured to configure the image enhancer responsive to detection of a scene change in the stream of images.

19. The device of claim 1, further comprising:
a modem configured to receive a stream of compressed input images, and wherein the one or more processors are configured to decode the stream of compressed input images to generate the stream of images.

20. A method comprising:
predicting, at a device, an image compression quality of an image of a stream of images; and
configuring, based on the predicted image compression quality, at the device, an image enhancer including:
generating a first enhanced image based on the image;
generating a second enhanced image based on the image:
determining a difference between the first enhanced image and the second enhanced image;
generating an adjustment image, by an image enhancement network of the configured image enhancer, based on the difference between the first enhanced image and the second enhanced image; and
generating an output image based on combining the adjustment image and the first enhanced image.

21. The method of claim 20, wherein the image includes compression artifacts.

22. The method of claim 20, wherein the image compression quality corresponds to a difference between the image and a pre-compression image that has been compressed to generate a compressed image, wherein the image is generated by decompressing the compressed image.

23. The method of claim 20, wherein predicting the image compression quality includes generating an image compression quality metric.

24. A non-transitory computer-readable medium storing instructions that, when executed by one or more processors, cause the one or more processors to:
predict an image compression quality of an image of a stream of images; and
configure, based on the predicted image compression quality, an image enhancer to:
generate a first enhanced image based on the image;
generate a second enhanced image based on the image;
determine a difference between the first enhanced image and the second enhanced image;
generate an adjustment image, by an image enhancement network of the configured image enhancer, based on the difference between the first enhanced image and the second enhanced image; and
combine the adjustment image and the first enhanced image to generate an output image.

25. The non-transitory computer-readable medium of claim 24, wherein the instructions, when executed by the one or more processors, cause the one or more processors to predict the image compression quality based on a predicted peak-signal-to-noise ratio (PSNR).

26. The non-transitory computer-readable medium of claim 24, wherein the instructions, when executed by the one or more processors, cause the one or more processors to predict the image compression quality based on a predicted structural similarity index measure (SSIM).

27. The non-transitory computer-readable medium of claim 24, wherein the instructions, when executed by the one or more processors, cause the one or more processors to adjust the predicted image compression quality based on high frequency information of the image, wherein the image enhancer is configured based on the adjusted predicted image compression quality.

28. An apparatus comprising:
means for predicting an image compression quality of an image of a stream of images; and
means for configuring, based on the predicted image compression quality. an image enhancer including:
means for generating a first enhanced image based on the image;
means for generating a second enhanced image based on the image;
means for determining a difference between the first enhanced image and the second enhanced image:
means for generating an adjustment image, by an image enhancement network of the configured image enhancer, based on the difference between the first enhanced image and the second enhanced image; and
means for generating an output image based on combining the adjustment image and the first enhanced image, based on the predicted image compression quality.

29. The apparatus of claim 28, wherein the means for predicting, the means for configuring, the means for generating the first enhanced image, the means for generating the second enhanced image, the means for determining the difference, the means for generating the adjustment image, and the means for generating the output image are integrated into a communication device, a computer, a display device, a television, a gaming console, a digital video player, a camera, a navigation device, a vehicle, a headset, an augmented reality headset, a mixed reality headset, a virtual reality headset, an aerial vehicle, a home automation system, a voice-activated device, an internet-of-things (IOT) device, a virtual reality (VR) device, a base station, or a mobile device.

* * * * *